United States Patent
Zhu et al.

(10) Patent No.: US 11,405,852 B2
(45) Date of Patent: Aug. 2, 2022

(54) DATA TRANSMISSION METHOD AND DATA TRANSMISSION APPARATUS

(71) Applicant: HUAWEI TECHNOLOGIES CO., LTD., Guangdong (CN)

(72) Inventors: Hualin Zhu, Shanghai (CN); Weisheng Jin, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 93 days.

(21) Appl. No.: 17/031,576

(22) Filed: Sep. 24, 2020

(65) Prior Publication Data
US 2021/0007042 A1 Jan. 7, 2021

Related U.S. Application Data

(63) Continuation of application No. PCT/CN2019/080913, filed on Apr. 2, 2019.

(30) Foreign Application Priority Data

Apr. 8, 2018 (CN) .......................... 201810306926.1
May 21, 2018 (CN) .......................... 201810490537.9

(51) Int. Cl.
*H04W 48/04* (2009.01)
*H04W 76/34* (2018.01)
(Continued)

(52) U.S. Cl.
CPC ........... *H04W 48/04* (2013.01); *H04W 60/04* (2013.01); *H04W 60/06* (2013.01); *H04W 76/34* (2018.02)

(58) Field of Classification Search
CPC ..... H04W 48/04; H04W 76/34; H04W 60/04; H04W 60/06; H04W 88/06; H04W 76/12;
(Continued)

(56) References Cited

U.S. PATENT DOCUMENTS

2016/0029361 A1* 1/2016 Lu ..................... H04W 72/0406
370/329
2018/0270791 A1* 9/2018 Park ..................... H04W 76/27
(Continued)

FOREIGN PATENT DOCUMENTS

| CN | 106714270 A | 5/2017 |
| CN | 107079363 A | 8/2017 |

(Continued)

OTHER PUBLICATIONS

3GPP TS 23.502 V15.1.0 (Mar. 20183), 3rd Generation Partnership Project;Technical Specification Group Services and System Aspects;Procedures for the 5G System;Stage 2(Release 15), 285 pages.

(Continued)

*Primary Examiner* — Mazda Sabouri
(74) *Attorney, Agent, or Firm* — Womble Bond Dickinson (US) LLP

(57) ABSTRACT

Embodiments of this application provide a data transmission method and a data transmission apparatus. The method includes: obtaining, by an access management network element, information about a connection status of a terminal device in a first network; and processing, by the access management network element, a data transmission procedure of the terminal device in a second network based on the information about the connection status of the terminal device in the first network. When the terminal device needs to transmit data through both the two networks, the method in the embodiments of this application can avoid a problem that the terminal device overuses a resource in either of the networks.

20 Claims, 14 Drawing Sheets

(51) Int. Cl.
*H04W 60/04* (2009.01)
*H04W 60/06* (2009.01)

(58) Field of Classification Search
CPC ..... H04W 76/16; H04W 76/27; H04W 48/02; H04W 48/18; H04W 76/22
See application file for complete search history.

(56) References Cited

U.S. PATENT DOCUMENTS

2019/0297555 A1* 9/2019 Hampel ................ H04L 47/58
2019/0327711 A1* 10/2019 Zhang ................... H04W 36/00

FOREIGN PATENT DOCUMENTS

| EP | 3691401 A2 | 8/2020 |
|---|---|---|
| WO | 2009139675 A1 | 11/2009 |

OTHER PUBLICATIONS

Qualcomm Incorporated, TS 23.502: Support of PDU sessions over non-3GPP access for UEs in CM-IDLE state over non-3GPP access. SA WG2 Meeting #121, May 15-19, 2017, Hangzhou, P.R. China, S2-173131, 18 pages.

TR-317, Network Enhanced Residential Gateway. Broadband forum, Issue: 1. Jul. 2016, 67 pages.

3GPP TR 23.716 V1.1.0 (Oct. 2018), 3rd Generation Partnership Project; Technical Specification Group Services and System Aspects; Study on the Wireless and Wireline Convergence for the 5G system architecture(Release 16), 162 pages.

3GPP TR 23.716 V0.2.0 (Jan. 2018), 3rd Generation Partnership Project; Technical Specification Group Services and System Aspects; Study on the Wireless and Wireline Convergence for the 5G system architecture(Release 16), 19 pages.

* cited by examiner

DATA TRANSMISSION METHOD AND DATA TRANSMISSION APPARATUS

CROSS-REFERENCE TO RELATED APPLICATION

This application is a continuation of International Application No. PCT/CN2019/080913, filed on Apr. 2, 2019, which claims priority to Chinese Patent Application No. 201810490537.9, filed on May 21, 2018, which claims priority to Chinese Patent Application No. 201810306926.1, filed on Apr. 8, 2018. The disclosure of the aforementioned applications are hereby incorporated by reference in their entireties.

TECHNICAL FIELD

Embodiments of this application relate to the communications field, and more particularly, to a data transmission method and a data transmission apparatus.

BACKGROUND

In a fifth generation (5G) communications network, a terminal device may access a core network by using a non-3rd generation partnership project (Non-3GPP) access technology, or a terminal device may access a core network by using a 3GPP access technology. However, in the prior art, the two access technologies of the terminal device are independent of each other. When the terminal device needs to access the core network by using both the two access technologies, resource overuse may be caused.

SUMMARY

Embodiments of this application provide a data transmission method and a data transmission apparatus, to avoid a resource overuse problem.

According to a first aspect of this application, a data transmission method is provided. The method includes: obtaining, by an access management network element, information about a connection status of a terminal device in a first network; and processing, by the access management network element, a data transmission procedure of the terminal device in a second network based on the information about the connection status of the terminal device in the first network.

According to a second aspect of this application, a data transmission method is provided. The method includes: obtaining, by a user plane data processing network element, information about a connection status of a terminal device in a first network; and processing, by the user plane data processing network element, a data transmission procedure of the terminal device in a second network based on the information about the connection status of the terminal device in the first network.

In a first possible embodiment of the second aspect, the connection status of the terminal device in the first network includes a deregistered state, a data transmission idle state, or a state in which the terminal device is physically disconnected from an access network; and the processing, by the user plane data processing network element, a data transmission procedure of the terminal device in a second network based on the information about the connection status of the terminal device in the first network includes: restricting, by the user plane data processing network element, the data transmission procedure of the terminal device in the second network.

With reference to the first possible embodiment of the second aspect, in a second possible embodiment of the second aspect, the restricting, by the user plane data processing network element, the data transmission procedure of the terminal device in the second network includes: rejecting, by the user plane data processing network element, transmission of user plane data of the terminal device in the second network; or decreasing, by the user plane data processing network element, a transmission rate of user plane data of the terminal device in the second network.

In a third possible embodiment of the second aspect, the connection status of the terminal device in the first network includes a registered state, a data transmission connected state, or a state in which the terminal device is physically connected to an access network; and the processing, by the user plane data processing network element, a data transmission procedure of the terminal device in a second network based on the information about the connection status of the terminal device in the first network includes: resuming, by the user plane data processing network element, the data transmission procedure of the terminal device in the second network.

With reference to the third possible embodiment of the second aspect, in a fourth possible embodiment of the second aspect, the resuming, by the user plane data processing network element, the data transmission procedure of the terminal device in the second network includes: transmitting, by the user plane data processing network element, user plane data of the terminal device in the second network; or increasing, by the user plane data processing network element, a transmission rate of user plane data of the terminal device in the second network.

In a fifth possible embodiment of the second aspect, the processing, by the user plane data processing network element, a data transmission procedure of the terminal device in a second network based on the information about the connection status of the terminal device in the first network includes:

adjusting, by the user plane data processing network element based on the information about the connection status of the terminal device in the first network, transmission of user plane data that is from the terminal device or that is to be sent to the terminal device.

In any possible embodiment of the second aspect, the obtaining, by a user plane data processing network element, information about a connection status of a terminal device in a first network includes: receiving, by the user plane data processing network element, the information about the connection status of the terminal device in the first network from an access management network element; or obtaining, by the user plane data processing network element, the information about the connection status of the terminal device in the first network by detecting the user plane data of the terminal device in the first network.

In any possible embodiment of the second aspect, the user plane data processing network element is a user plane function network element accessed by the terminal device in the first network, a user plane function network element accessed by the terminal device in the second network, or an access network device accessed by the terminal device in the second network.

According to a third aspect of this application, a data transmission method is provided. The method includes: obtaining, by a session management network element, information about a connection status of a terminal device in a first network; and processing, by the session management network element, a data transmission procedure of the terminal device in a second network based on the information about the connection status of the terminal device in the first network.

In a first possible embodiment of the third aspect, the connection status of the terminal device in the first network includes a deregistered state, a data transmission idle state, or a state in which the terminal device is physically disconnected from an access network; and the processing, by the session management network element, a data transmission procedure of the terminal device in a second network based on the information about the connection status of the terminal device in the first network includes: restricting, by the session management network element, the data transmission procedure of the terminal device in the second network.

With reference to the first possible embodiment of the third aspect, in a second possible embodiment of the third aspect, the restricting, by the session management network element, the data transmission procedure of the terminal device in the second network includes: rejecting, by the session management network element, transmission of user plane data of the terminal device in the second network; or decreasing, by the session management network element, a transmission rate of user plane data of the terminal device in the second network.

With reference to the second possible embodiment of the third aspect, in a third possible embodiment of the third aspect, the rejecting, by the session management network element, transmission of user plane data of the terminal device in the second network includes: performing, by the session management network element, a session release procedure of the terminal device in the second network; or the decreasing, by the session management network element, a transmission rate of user plane data of the terminal device in the second network includes: performing, by the session management network element, a session modification procedure of the terminal device in the second network.

In a fourth possible embodiment of the third aspect, the connection status of the terminal device in the first network includes a registered state, a data transmission connected state, or a state in which the terminal device is physically connected to an access network; and the processing, by the session management network element, a data transmission procedure of the terminal device in a second network based on the information about the connection status of the terminal device in the first network includes: resuming, by the session management network element, the data transmission procedure of the terminal device in the second network.

With reference to the fourth possible embodiment of the third aspect, in a fifth possible embodiment of the third aspect, the resuming, by the session management network element, the data transmission procedure of the terminal device in the second network includes: resuming, by the session management network element, the session management network element of the terminal device in the second network; or increasing, by the session management network element, a transmission rate of user plane data of the terminal device in the second network.

With reference to the fifth possible embodiment of the third aspect, in a sixth possible embodiment of the third aspect, the resuming, by the session management network element, the user plane data procedure of the terminal device in the second network includes: performing, by the session management network element, a session establishment procedure of the terminal device in the second network; or the increasing, by the session management network element, a transmission rate of user plane data of the terminal device in the second network includes: performing, by the session management network element, a session modification procedure of the terminal device in the second network.

In a seventh possible embodiment of the third aspect, the processing, by the session management network element, a data transmission procedure of the terminal device in a second network based on the information about the connection status of the terminal device in the first network includes: performing, by the session management network element, a PDU session establishment procedure of the terminal in the second network based on the information about the connection status; or performing, by the session management network element, a PDU session modification procedure of the terminal in the second network based on the information about the connection status.

In any possible embodiment of the third aspect, the obtaining, by a session management network element, information about a connection status of a terminal device in a first network includes: receiving, by the session management network element, the information about the connection status of the terminal device in the first network from an access management network element.

According to a fourth aspect of this application, a data transmission method is provided. The method includes: obtaining, by a policy control network element, information about a connection status of a terminal device in a first network; and processing, by the policy control network element, a data transmission procedure of the terminal device in a second network based on the information about the connection status of the terminal device in the first network.

In a first possible embodiment of the fourth aspect, the processing, by the policy control network element, a data transmission procedure of the terminal device in a second network based on the information about the connection status of the terminal device in the first network includes: performing, by the policy control network element, a PDU session establishment procedure of the terminal in the second network based on the information about the connection status; or performing, by the policy control network element, a PDU session modification procedure of the terminal in the second network based on the information about the connection status.

In a second possible embodiment of the fourth aspect, the processing, by the policy control network element, a data transmission procedure of the terminal device in a second network based on the information about the connection status of the terminal device in the first network includes: initiating, by the policy control network element, a PDU session release procedure of the terminal device in the second network based on the information about the connection status; or rejecting, by the policy control network element, a session establishment procedure of the terminal device in the second network based on the information about the connection status.

According to a fifth aspect of this application, a data transmission method is provided. The method includes: obtaining, by a data management network element, information about a connection status of a terminal device in a first network; and processing, by the data management network element, a data transmission procedure of the terminal device in a second network based on the information about the connection status of the terminal device in the first network.

In a first possible embodiment of the fifth aspect, the processing, by the data management network element, a data transmission procedure of the terminal device in a second network based on the information about the connection status of the terminal device in the first network includes:

performing, by the data management network element, a deregistration procedure of the terminal device in the second network based on the information about the connection status.

In a second possible embodiment of the fifth aspect, the processing, by the data management network element, a data transmission procedure of the terminal device in a second network based on the information about the connection status of the terminal device in the first network includes:

initiating, by the data management network element, a subscription update procedure of the terminal device based on the information about the connection status; or performing, by the data management network element, a service request procedure of the terminal device in the second network based on the information about the connection status.

In a third possible embodiment of the fifth aspect, the processing, by the data management network element, a data transmission procedure of the terminal device in a second network based on the information about the connection status of the terminal device in the first network includes: performing, by the data management network element, a registration procedure of the terminal device in the second network based on the information about the connection status.

According to a sixth aspect of this application, a data transmission apparatus is provided. The apparatus includes: a storage unit, configured to store a computer instruction; and a processing unit, configured to perform the following operations according to the computer instruction stored in the storage unit: obtaining information about a connection status of a terminal device in a first network; and processing a data transmission procedure of the terminal device in a second network based on the information about the connection status of the terminal device in the first network.

In the sixth aspect, the data transmission apparatus may be an access management network element, a user plane data processing network element, a session management network element, a policy control network element, or a data management network element.

When the data transmission apparatus is the user plane data processing network element, the processing unit is configured to perform an operation in any possible embodiment of the second aspect according to the computer instruction stored in the storage unit.

When the data transmission apparatus is the session management network element, the processing unit is configured to perform an operation in any possible embodiment of the third aspect according to the computer instruction stored in the storage unit.

When the data transmission apparatus is the policy control network element, the processing unit is configured to perform an operation in any possible embodiment of the fourth aspect according to the computer instruction stored in the storage unit.

When the data transmission apparatus is the data management network element, the processing unit is configured to perform an operation in any possible embodiment of the fifth aspect according to the computer instruction stored in the storage unit.

In any one of the foregoing aspects, the first network is a non-3rd generation partnership project 3GPP network and the second network is a 3GPP network; or the first network is a wireline network and the second network is a wireless network.

According to a seventh aspect of this application, a computer storage medium is provided. The computer-readable storage medium stores an instruction. When the instruction is run on a computer, the computer is enabled to perform the method according to any one of the first aspect to the fifth aspect or the possible embodiments.

According to an eighth aspect of this application, a computer program product including an instruction is provided. When the computer program product runs on a computer, the computer is enabled to perform the method according to any one of the first aspect to the fifth aspect or the possible embodiments.

In the embodiments of this application, the access management network element, the user plane data processing network element, or the session processing network element processes the data transmission procedure of the terminal device in the second network based on the information about the connection status of the terminal device in the first network, and associates a data transmission procedure of the terminal device in the first network with the data transmission procedure of the terminal device in the second network, to avoid a problem that the terminal device overuses a resource in either of the networks when the terminal device needs to transmit data through both the two networks.

DESCRIPTION OF EMBODIMENTS

Embodiments of this application are applicable to a scenario in which a plurality of networks are used for multi-access, for example, a communications network in which a non-3GPP technology and a 3GPP technology are used for multi-access. A network using the non-3GPP technology may include a Wi-Fi network, a MulteFire network, a wireline network, or a home base station network. A network using the 3GPP technology may include a global system for mobile communications (GSM), a wideband code division multiple access (WCDMA) network, a long term evolution (LTE) network, a 5G network, or a subsequently evolved mobile communications network. In the embodiments of this application, a wireless and wireline convergence (WWC) network in a 5G system architecture is used as an example for description.

Figure 1:
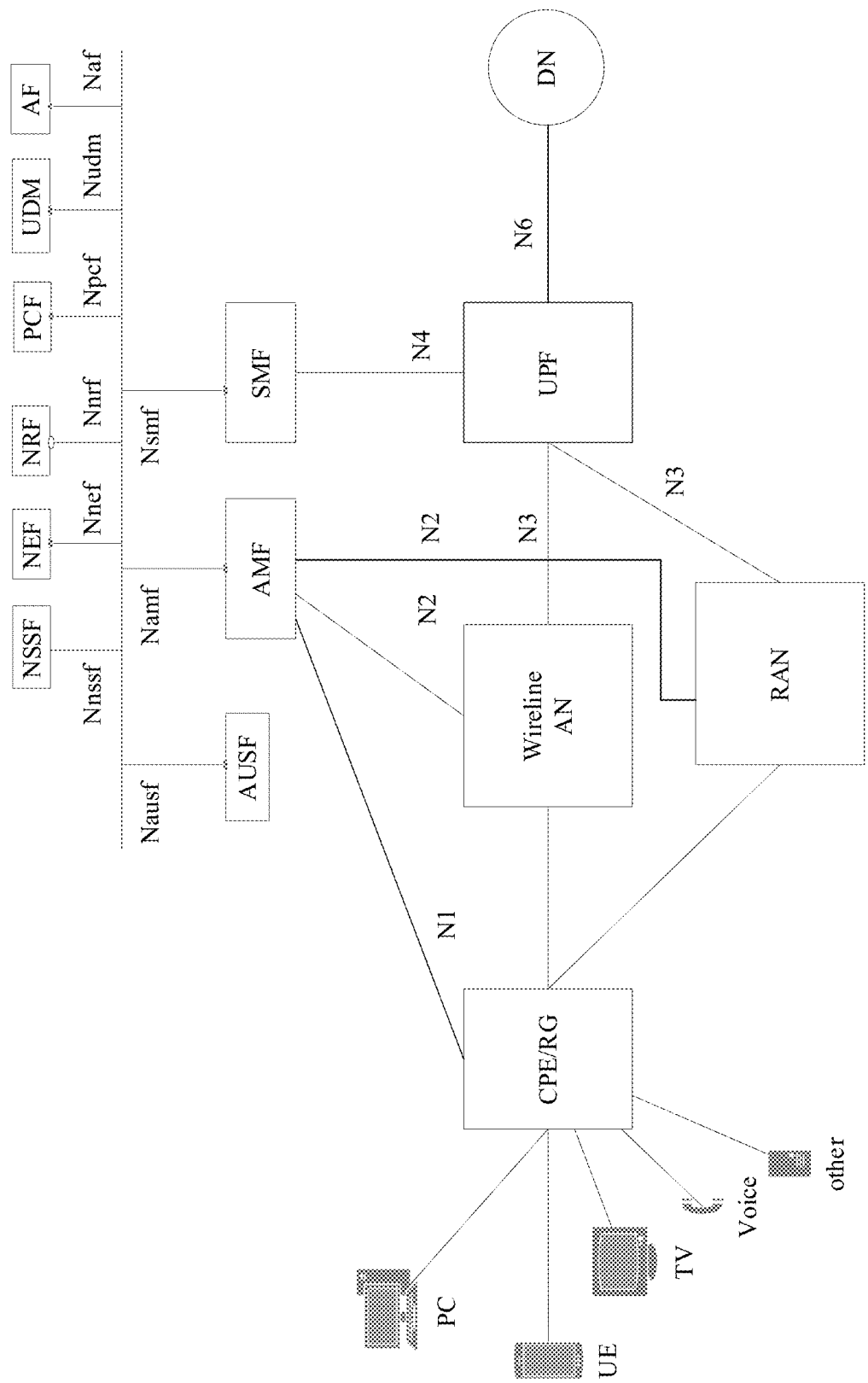
FIG. 1 is a schematic diagram of a communications system according to an embodiment of this application.

FIG. 1 is a schematic diagram of a communications system that can implement an embodiment of this application. In the communications system, customer-premises equipment (CPE)/a residential gateway (RG) may access a core network in a wireless/wireline manner. In one embodiment, the CPE/RG may access a 5G core network through a wireline access network (wireline AN), or the CPE/RG may access the 5G core network through a radio access network (RAN). The CPE/RG may be provided by a network operator for a user. The CPE/RG may provide a wireline or wireless connection for a personal computer (PC), a television (TV), user equipment (UE), a voice device, or another electronic device. In this embodiment of this application, a terminal device includes the CPE/RG. Certainly, the terminal device may alternatively be another device that can perform multi-access by using a non-3GPP technology and a 3GPP technology, for example, a terminal device in an internet of things, a smart household appliance, a virtual reality device, or a terminal device in a future network. This is not limited herein.

The wireline access network may include an access device and a gateway device. The access device may be a fiber access device, an ethernet access device, or a switch. The gateway device may be an access gateway function (AGF) network element or a broadband network gateway (BNG). The radio access network device may be a device that performs wireless communication with the terminal device. The radio access network device may provide communications coverage for a particular geographical area, and may communicate with a terminal device located in an area (a cell) of the coverage. The radio access network may include an evolved NodeB (eNodeB), an access network device in a 5G network, an access point (AP) device, an access network device in a future evolved PLMN, or the like.

The core network may include an access and mobility management function (AMF) network element, a session management function (SMF) network element, and a user plane function (UPF) network element. User plane data is transmitted between the terminal device and a data network (DN) through the access network and the UPF network element. The AMF network element may implement at least one of the following functions: access and mobility management, termination of a non-access stratum (NAS) message, completion of registration management, connection management, reachability management, assignment of a tracking area (TA) list, or transparent routing of a session management (SM) message to the SMF network element. The SMF network element may implement at least one of the following functions: session management, assignment and management of an IP address of the terminal device, assignment and selection of a user plane anchor function, or (re)selection of a UPF network element and a user plane path. The AMF network element and the SMF network element may communicate with another network element in a service-based manner. The another network element may be at least one of the following network elements: a policy control function (PCF) network element, an application function (AF) network element, a network slice selection function (NSSF) network element, an authentication server function (AUSF) network element, a network exposure function (NEF) network element, a network function repository function (NF Repository Function, NRF) network element, or a unified data management (UDM) network element. The network elements may be in communication connection through interfaces shown in FIG. 1.

Figure 2:
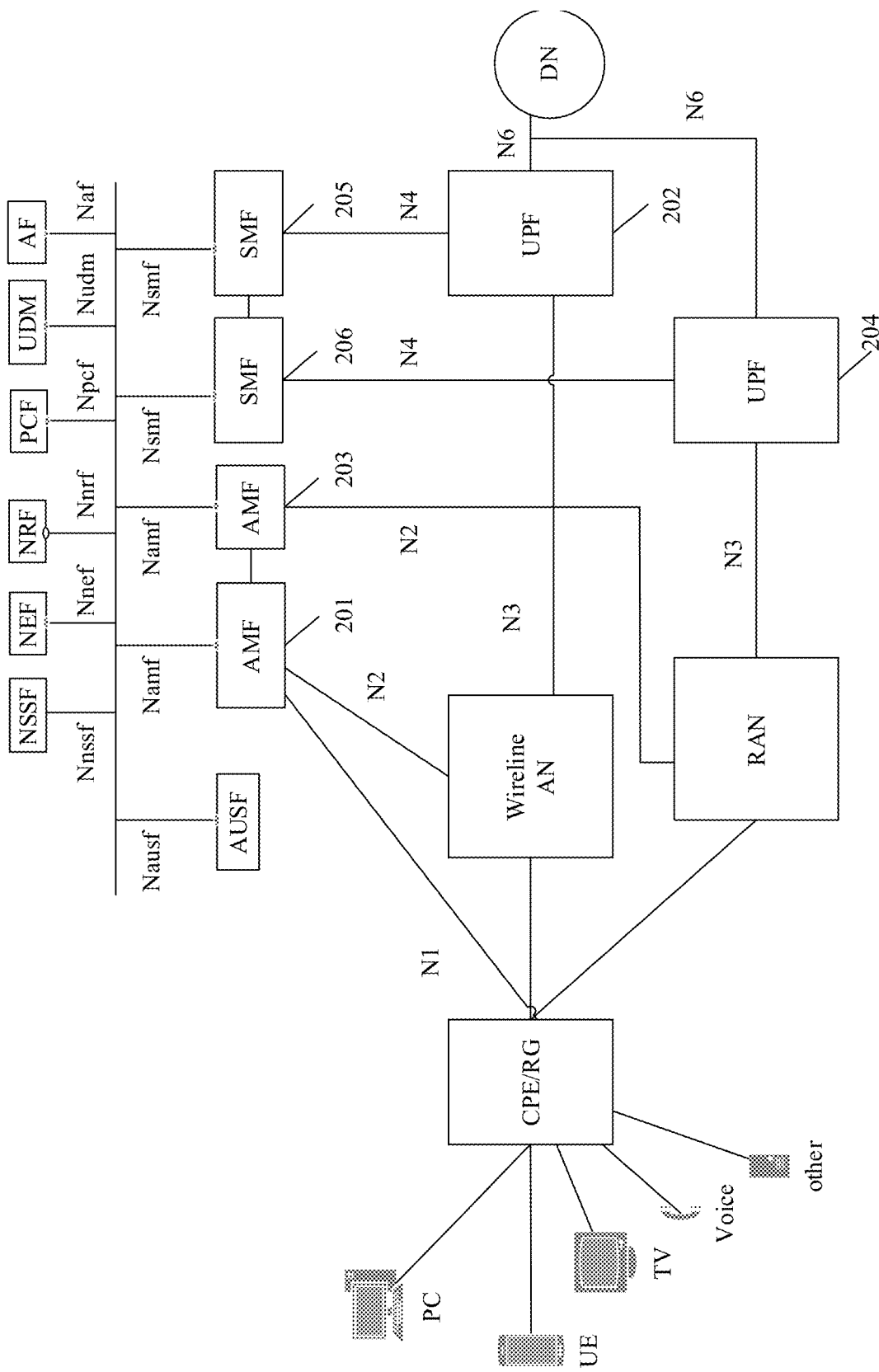
FIG. 2 is a schematic diagram of another communications system according to an embodiment of this application.

In the communications system shown in FIG. 1, the terminal device is connected to a same AMF network element and a same UPF network element in a wireline/wireless manner, or the terminal device may be connected to different AMF network elements and different UPF network elements in a wireline/wireless manner, as shown in FIG. 2. FIG. 2 is a schematic diagram of another communications system that can implement an embodiment of this application. For a same part of the communications system shown in FIG. 2 and the communications system shown in FIG. 1, refer to the descriptions of FIG. 1. A difference between the communications system in FIG. 2 and the communications system in FIG. 1 lies in that the terminal device is connected to a first AMF network element 201 and a first UPF network element 202 in a wireline manner, and the terminal device is connected to a second AMF network element 203 and a second UPF network element 204 in a wireless manner. Correspondingly, a first SMF network element 205 manages the first UPF network element 202, and a second SMF network element 206 manages the second UPF network element 204. The first AMF network element 201 and the second AMF network element 203 are in communication connection, and the first SMF network element 205 and the second SMF network element 206 are in communication connection. The network elements may be in communication connection through interfaces shown in FIG. 2.

It may be understood that in the communications systems shown in FIG. 1 and FIG. 2, functions and interfaces of the network elements are merely examples. Not all functions are required when the network elements are applied to the embodiments of this application. All or some network elements of the core network may be physical entity network elements, or may be virtualized network elements. This is not limited herein.

"/" in the embodiments of this application describes only an association relationship for describing associated objects and represents that three relationships may exist. For example, A/B may represent the following cases: Only A exists, both A and B exist, and only B exists. In addition, in the descriptions of this application, "a plurality of" means two or more than two.

In the embodiments of this application, that a network element (for example, a network element A) obtains information from another network element (for example, a network element B) may mean that the network element A directly receives the information from the network element B, or may mean that the network element A receives the information from the network element B through another network element (for example, a network element C). When the network element A receives the information from the network element B through the network element C, the network element C may transparently transmit the information, or may process the information, for example, transmit the information through different messages, or filter the information and send only filtered information to the network element A. Similarly, in the embodiments of this application, that the network element A sends information to the network element B may mean that the network element A directly sends the information to the network element B, or may mean that the network element A sends the information to the network element B through another network element (for example, the network element C).

In the communications system shown in FIG. 1 or FIG. 2, when the terminal device transmit data with the DN through both the wireline access network and the wireless access network, if the data transmission between the terminal device and the wireline access network is interrupted, all remaining to-be-transmitted data between the terminal device and the DN needs to be transmitted through the wireless access network. Consequently, radio access resource overuse is caused.

Figure 3:
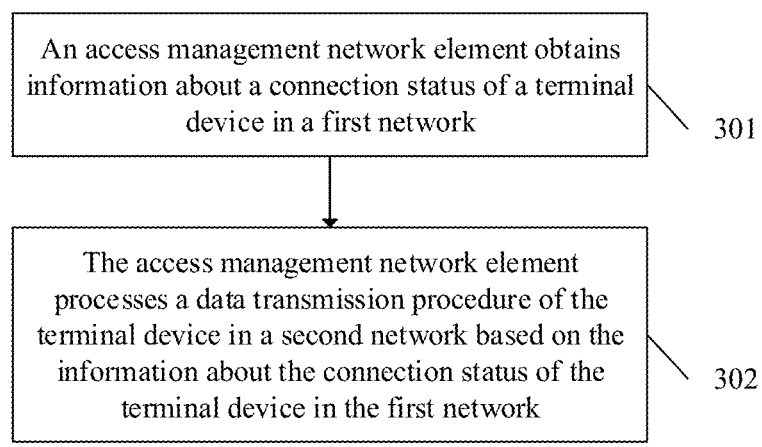
FIG. 3 is a schematic flowchart of a data transmission method according to a first embodiment of this application.

To resolve the foregoing problem, a first embodiment of this application provides a data transmission method. As shown in FIG. 3, the data transmission method includes the following operations.

Operation 301: An access management network element obtains information about a connection status of a terminal device in a first network.

In this embodiment of this application, the access management network element may be the AMF network element in FIG. 1, or may be another network element, for example, a mobility management entity (MME), having an access management function. This is not limited herein. In a possible embodiment, the first network may be a non-3GPP network, for example, a wireline network, a Wi-Fi network, a MulteFire network, or a private network; and a second network may be a 3GPP network, for example, a 5G network or an LTE network. In another possible embodiment, the first network may be a 3GPP network, and the second network is a non-3GPP network. Access networks in the first network and the second network are different, and core network elements accessed by the terminal device are the same. In one embodiment, the terminal device accesses the same core network element by using two different access technologies, as shown in FIG. 1. Access networks in the first network and the second network are different, and core network elements accessed by the terminal device are also different. In one embodiment, the terminal device accesses the different core network elements by using two different access technologies, as shown in FIG. 2.

The connection status of the terminal device in the first network may be a physical connection status between the terminal device and the access network, for example, a cable connection status between the terminal device and the access network device. The connection status may be a connected state or a disconnected state. The connection status of the terminal device in the first network may alternatively be a status of whether the terminal device is registered with the first network, for example, a registered state or a deregistered state. The connection status of the terminal device in the first network may alternatively be a data transmission status of the terminal device in the first network, for example, a connected state or an idle state. In this embodiment of this application, the connection status of the terminal device in the first network includes a first connection status and a second connection status. The first connection status includes a deregistered state of the terminal device in the first network, a data transmission idle state of the terminal device in the first network, or a state in which the terminal device is physically disconnected from the access network. The second connection status includes a registered state of the terminal device in the first network, a data transmission connected state of the terminal device in the first network, or a state in which the terminal device is physically connected to the access network.

The access management network element may obtain the information about the connection status of the terminal device in the first network in the following manners.

Manner 1: The access management network element obtains the information about the connection status of the terminal device in the first network according to a heartbeat mechanism.

A heartbeat message may be sent between the access management network element and the terminal device, and the access management network element determines the connection status of the terminal device in the first network by detecting the heartbeat message, for example, a non-access stratum (NAS) heartbeat message. In one embodiment, if the access management network element detects no heartbeat message from the terminal device, the access management network element determines that the terminal device is in the first connection status in the first network.

Manner 2: The access management network element receives a message from an access network element, an access management network element, or a user plane function network element that is accessed by the terminal device in the first network. The message includes the information about the connection status of the terminal device in the first network.

In a possible embodiment, a heartbeat message may be sent between the terminal device and the access network element of the first network, and the access network element of the first network determines the connection status of the terminal device in the first network by detecting the heartbeat message. The access network element of the first network sends the information about the connection status of the terminal device in the first network to the access management network element, so that the access management network element can obtain the connection status of the terminal device in the first network. For example, an ethernet heartbeat message may be sent between the terminal device and a fiber access device. The fiber access device determines the connection status of the terminal device in the first network by detecting the ethernet heartbeat message. Then, the fiber access device sends the information about the connection status of the terminal device in the first network to the access management network element. For another example, a point-to-point protocol over ethernet (PPPoE) heartbeat message may be sent between the terminal device and an AGF/a BNG network element. The AGF/BNG network element determines the connection status of the terminal device in the first network by detecting the heartbeat message. Then, the AGF/BNG network element sends the information about the connection status of the terminal device in the first network to the access management network element.

In another possible embodiment, the UPF network element accessed by the terminal device in the first network determines the connection status of the terminal device in the first network depending on whether user plane data sent to or from the terminal device is detected. The UPF network element sends the information about the connection status of the terminal device in the first network to the access management network element, so that the access management network element can obtain the connection status of the terminal device in the first network. For example, if the UFP network element detects, within a time period, no user plane data sent to or from the terminal device, the UFP network element determines that the terminal device is in the first connection status in the first network; or if the UPF network element detects, in a time period, the user plane data sent to or from the terminal device, the UPF network element determines that the terminal device is in the second connection status in the first network.

If access management network elements accessed by the terminal device in the first network and the second network are different (for example, as shown in FIG. 2), a first access management network element accessed by the terminal device in the first network obtains the connection status of the terminal device in the first network. Then, the first access management network element sends the information about the connection status of the terminal device in the first network to a second access management network element accessed by the terminal device in the second network. The second access management network element processes a data transmission procedure of the terminal device in the second network based on the information about the connection status of the terminal device in the first network.

In a possible embodiment, the terminal device may alternatively obtain the connection status of the terminal device in the first network by using a heartbeat mechanism, and then send the connection status of the terminal device in the first network to the access management network element.

In this embodiment of this application, the information about the connection status of the terminal device in the first network may be a particular connection status, or may be information indicating the connection status. This is not limited herein.

Operation 302: The access management network element processes a data transmission procedure of the terminal device in the second network based on the information about the connection status of the terminal device in the first network.

In this embodiment of this application, the data transmission procedure includes an ongoing data transmission procedure or a procedure of initiating data transmission. The following separately describes the two scenarios.

Scenario 1: The terminal device transmits data through both the first network and the second network.

When the terminal device transmits data through both the first network and the second network, the processing, by the access management network element, a data transmission procedure of the terminal device in the second network based on the information about the connection status of the terminal device in the first network includes:

if the terminal device is in the first connection status in the first network, restricting, by the access management network element, the data transmission procedure of the terminal device in the second network; or if the terminal device is in the second connection status in the first network, resuming, by the access management network element, the data transmission procedure of the terminal device in the second network.

In one embodiment, the access management network element may restrict the data transmission procedure of the terminal device in the second network in any one of Manner 1 to Manner 6.

Manner 1:

The access management network element sends first indication information to a user plane data processing network element accessed by the terminal device in the second network. The first indication information indicates the user plane data processing network element to restrict user plane data that is from the terminal device or that is to be sent to the terminal device.

The user plane data processing network element may be a network element, for example, a UPF network element or a base station, having a user plane data processing function. The first indication information may be the information about the connection status of the terminal device in the first network, for example, information about the first connection status.

That the user plane data processing network element restricts the user plane data that is from the terminal device or that is to be sent to the terminal device includes: rejecting, by the user plane data processing network element, the user plane data that is from the terminal device or that is to be sent to the terminal device; or decreasing, by the user plane data processing network element, a transmission rate of the user plane data that is from the terminal device or that is to be sent to the terminal device.

Further, the user plane data processing network element may restrict user plane data, from the terminal device or to be sent to the terminal device, of a specific service. For example, the user plane data processing network element rejects sending of the user plane data, from the terminal device or to be sent to the terminal device, of the specific service; or the user plane data processing network element decreases a transmission rate of the user plane data, from the terminal device or to be sent to the terminal device, of the specific service. The user plane data processing network element may determine services whose user plane data is to be restricted. For example, the user plane data processing network element may determine, based on a service priority, services whose user plane data is to be restricted. The user plane data processing network element may alternatively receive indication information from another network element, and determine, based on the received indication information, services whose user plane data is to be restricted. For example, the UPF network element may receive filter information from an SMF network element, and determine, based on the filter information, services whose user plane data is to be restricted.

In a possible embodiment, the first indication information may include at least one of the following information: identification information of the terminal device (for example, an identifier of the terminal device or IP address information of the terminal device), and packet data unit (PDU) session information of the terminal device in the second network, or data tunnel information (for example, a tunnel endpoint identifier (TEID)) of the terminal device in the second network. If the first indication information includes the PDU session information, the user plane data processing network element restricts a transmission procedure of user plane data corresponding to the PDU session information.

Manner 2:

The access management network element initiates a deregistration procedure of the terminal device in the second network. For a procedure in which the access management network element initiates deregistration, refer to the prior art. Details are not described herein.

Manner 3:

The access management network element initiates a PDU session release procedure or a PDU session modification procedure of the terminal device in the second network. For a procedure in which the access management network element initiates PDU session release or PDU session modification, refer to the prior art. Details are not described herein.

In a possible embodiment, the access management network element rejects, by initiating the PDU session release procedure, sending of user plane data that is from the terminal device or that is to be sent to the terminal device. The access management network element decreases, by initiating the PDU session modification procedure, a transmission rate of user plane data that is from the terminal device or that is to be sent to the terminal device. For example, the access management network element reduces, by initiating the PDU session modification procedure, quality of service (QoS) corresponding to a session.

Manner 4:

The access management network element sends second indication information to a session management network element accessed by the terminal device in the second network. The second indication information indicates the session management network element to initiate a PDU session release procedure or a PDU session modification procedure of the terminal device in the second network. For a procedure in which the session management network element initiates PDU session release or PDU session modification, refer to the prior art. Details are not described herein.

In a possible embodiment, the second indication information may be the information about the connection status of the terminal device in the first network, for example, information about the first connection status. The second indication information may include at least one of the following information: identification information of the terminal device, PDU session information of the terminal device in the second network, or data tunnel information of the terminal device in the second network. If the second indication information includes the PDU session information, the session management network element initiates a PDU session release or modification procedure corresponding to the PDU session information.

In a possible embodiment, the access management network element sends the information about the first connection status to the session management network element accessed by the terminal device in the second network, and the session management network element initiates the PDU session release procedure or the PDU session modification procedure of the terminal device in the second network based on the information about the first connection status.

Manner 5:

The access management network element sends information about the first connection status of the terminal device in the first network to a policy control network element.

The policy control network element may be a PCF network element.

In a possible embodiment, the policy control network element initiates a PDU session release procedure of the terminal device in the second network based on the information about the first connection status. For details about initiating of the PDU session release procedure by the policy control network element, refer to the prior art.

In a possible embodiment, the policy control network element performs a PDU session modification procedure of the terminal in the second network based on the information about the first connection status. In one embodiment, the policy control network element decreases, by initiating the PDU session modification procedure, a transmission rate of user plane data that is from the terminal device or that is to be sent to the terminal device. For example, the policy control network element reduces, by initiating the PDU session modification procedure, QoS corresponding to a session.

Manner 6:

The access management network element sends information about the first connection status of the terminal device in the first network to a data management network element.

The data management network element may be a UDM network element or a UDR (unified data repository) network element.

In a possible embodiment, the data management network element performs a deregistration procedure of the terminal device in the second network based on the information about the first connection status.

In a possible embodiment, the data management network element initiates a subscription update procedure of the terminal device based on the information about the first connection status. QoS of the terminal device in the second network is reduced by initiating the subscription update procedure. For details of the subscription update procedure, refer to the prior art.

In the foregoing Manner 1 to Manner 5:

After the access management network element restricts the data transmission procedure of the terminal device in the second network, the access management network element may send reason information to the terminal device. The reason information notifies the terminal device of a reason why the data transmission procedure of the terminal device in the second network is restricted. In one embodiment, the reason information may be the information about the connection status of the terminal device in the first network. For example, the terminal device is in the deregistered state, the data transmission idle state, or the state in which the terminal device is physically disconnected from the access network in the first network.

When the terminal device transmits data by using both the first network and the second network, because the terminal device is in the first connection status in the first network, the access management network element restricts the data transmission procedure of the terminal device in the second network. Then, if the terminal device is in the second connection status in the first network, the access management network element resumes the data transmission procedure of the terminal device in the second network. In this embodiment of this application, the resuming the data transmission procedure of the terminal device in the second network may be resuming to a state before the data transmission procedure of the terminal device in the second network is restricted, may be releasing a state in which the data transmission procedure of the terminal device in the second network is restricted, or may be increasing a data transmission rate of the terminal device in the second network.

In one embodiment, the access management network element may resume the data transmission procedure of the terminal device in the second network in any one of Manner 7 to Manner 11.

Manner 7:

The access management network element sends third indication information to a user plane data processing network element accessed by the terminal device in the second network. The third indication information indicates the user plane data processing network element to resume transmission of user plane data that is from the terminal device or that is to be sent to the terminal device.

The user plane data processing network element may be a network element, for example, a UPF network element or a base station, having a user plane data processing function. The third indication information may be the information about the connection status of the terminal device in the first network, for example, information about the second connection status.

Resuming, by the user plane data processing network element, the transmission of the user plane data that is from the terminal device or that is to be sent to the terminal device includes: sending, by the user plane data processing network element, the user plane data that is from the terminal device or that is to be sent to the terminal device; or increasing, by the user plane data processing network element, a transmission rate of the user plane data that is from the terminal device or that is to be sent to the terminal device. If the terminal device is in the first connection status in the first network, the user plane data processing network element rejects sending of the user plane data that is from the terminal device or that is to be sent to the terminal device, and if the terminal device is in the second connection status in the first network, the user plane data processing network element continues to send the user plane data that is from the terminal device or that is to be sent to the terminal device. In this scenario, a transmission rate used by the user plane data processing network element to send the user plane data is not limited in this embodiment of this application. If the terminal device is in the first connection status in the first network, the user plane data processing network element decreases the transmission rate of the user plane data that is from the terminal device or that is to be sent to the terminal device, and if the terminal device is in the second connection status in the first network, the user plane data processing network element increases the transmission rate of the user plane data that is from the terminal device or that is to be sent to the terminal device.

Further, the user plane data processing network element may resume transmission of user plane data, from the terminal device or to be sent to the terminal device, of a specific service. For example, the user plane data processing network element sends the user plane data, from the terminal device or to be sent to the terminal device, of the specific service; or the user plane data processing network element increases a transmission rate of the user plane data, from the terminal device or to be sent to the terminal device, of the specific service. The user plane data processing network element may determine services whose user plane data is to be restored. For example, the user plane data processing network element may determine, based on a service priority, services whose user plane data is to be restored. The user plane data processing network element may alternatively receive indication information from another network element, and determine, based on the received indication information, services whose user plane data is to be restored. For example, the UPF network element may receive filter information from an SMF network element, and determine, based on the filter information, services whose user plane data is to be restored.

In a possible embodiment, the third indication information may include at least one of the following information: identification information of the terminal device, PDU session information of the terminal device in the second network, or data tunnel information of the terminal device in the second network. If the third indication information includes the PDU session information, the user plane data processing network element resumes a transmission procedure of user plane data corresponding to the PDU session information.

Manner 8:

The access management network element initiates a PDU session modification procedure of the terminal device in the second network. For a procedure in which the access management network element initiates PDU session modification, refer to the prior art. Details are not described herein.

In a possible embodiment, the access management network element increases, by initiating the PDU session modification procedure, a transmission rate of user plane data that is from the terminal device or that is to be sent to the terminal device. For example, the access management network element improves, by initiating the PDU session modification procedure, QoS corresponding to a session.

Manner 9:

The access management network element sends fourth indication information to a session management network element accessed by the terminal device in the second network. The fourth indication information indicates the session management network element to initiate a PDU session modification procedure of the terminal device in the second network. For a procedure in which the session management network element initiates PDU session modification, refer to the prior art. Details are not described herein.

In a possible embodiment, the fourth indication information may be the information about the connection status of the terminal device in the first network, for example, information about the second connection status. The fourth indication information may include at least one of the following information: identification information of the terminal device, PDU session information of the terminal device in the second network, or data tunnel information of the terminal device in the second network. If the fourth indication information includes the PDU session information, the session management network element initiates a PDU session modification procedure corresponding to the PDU session information.

In a possible embodiment, the access management network element sends the information about the second connection status to the session management network element accessed by the terminal device in the second network, and the session management network element initiates a PDU session release procedure or the PDU session modification procedure of the terminal device in the second network based on the information about the second connection status.

Manner 10

The access management network element sends information about the second connection status of the terminal device in the first network to a policy control network element.

In a possible embodiment, the policy control network element performs a PDU session establishment procedure of the terminal in the second network based on the information about the second connection status. For example, the policy control network element increases a transmission rate of user plane data of the terminal device in the second network by improving QoS corresponding to a to-be-established session.

In a possible embodiment, the policy control network element performs a PDU session modification procedure of the terminal in the second network based on the information about the second connection status. In one embodiment, the policy control network element initiates the PDU session modification procedure, to increase the transmission rate of the user plane data that is from the terminal device or that is to be sent to the terminal device. For example, the policy control network element improves, by initiating the PDU session modification procedure, the QoS corresponding to the session.

For the foregoing Manner 5 and Manner 9, in a possible embodiment, the policy control network element may send a subscription message to the access management network element. The subscription message indicates the access management network element to send changed status information when the connection status of the terminal device in the first network changes. For example, if the connection status of the terminal device in the first network changes from the first connection status to the second connection status, the access management network element sends the information about the second connection status of the terminal device in the first network to the policy control network element based on the subscription message; or if the connection status of the terminal device in the first network changes from the second connection status to the first connection status, the access management network element sends the information about the first connection status of the terminal device in the first network to the policy control network element based on the subscription message.

Manner 11

The access management network element sends information about the second connection status of the terminal device in the first network to a data management network element.

In a possible embodiment, the data management network element initiates a subscription update procedure of the terminal device based on the information about the second connection status. QoS of the terminal device in the second network is improved by initiating the subscription update procedure. For details of the subscription update procedure, refer to the prior art.

In a possible embodiment, the data management network element performs a registration procedure of the terminal device in the second network based on the information about the second connection status.

Scenario 2: The terminal device has accessed the first network and needs to transmit data through the second network.

When the terminal device has accessed the first network and needs to transmit data through the second network, the terminal device initiates a registration procedure or a session establishment procedure in the second network. If the access management network element determines that the terminal device is in the first connection status in the first network, the access management network element may restrict the data transmission procedure of the terminal device in the second network in the following manner: rejecting, by the access management network element, the registration procedure of the terminal device in the second network; or rejecting, by the access management network element, the session establishment procedure of the terminal device in the second network; or sending, by the access management network element, indication information to a session management network element, to indicate the session management network element to reject the session establishment procedure of the terminal device in the second network. For a procedure in which the access management network element rejects registration and a procedure in which the access management network element rejects session establishment, refer to the prior art. Details are not described herein. If the access management network element determines that the terminal device is in the second connection status in the first network, the access management network element does not restrict the data transmission procedure of the terminal device in the second network, and continues to perform the registration procedure or the session establishment procedure initiated by the terminal device in the second network.

In a possible embodiment, if the access management network element determines that the terminal device is in the first connection status in the first network, the access management network element sends information about the first connection status to the session management network element. The session management network element performs the PDU session establishment procedure of the terminal in the second network based on the information about the first connection status. For example, the session management network element decreases a transmission rate of user plane data of the terminal device in the second network by reducing QoS corresponding to a to-be-established session. If the access management network element determines that the terminal device is in the second connection status in the first network, the access management network element sends information about the second connection status to the session management network element. The session management network element does not restrict the data transmission procedure of the terminal device in the second network.

In a possible embodiment, if the access management network element determines that the terminal device is in the first connection status in the first network, the access management network element sends information about the first connection status to a policy control network element. The policy control network element rejects a session establishment procedure of the terminal device in the second network based on the information about the first connection status. For details about rejecting, by the policy control network element, the PDU session establishment procedure, refer to the prior art. Alternatively, the policy control network element performs a PDU session establishment procedure of the terminal in the second network based on the information about the first connection status. For example, the policy control network element decreases a transmission rate of user plane data of the terminal device in the second network by reducing QoS corresponding to a to-be-established session. If the access management network element determines that the terminal device is in the second connection status in the first network, the access management network element sends information about the second connection status to the policy control network element. The policy control network element does not restrict the data transmission procedure of the terminal device in the second network.

In a possible embodiment, if the access management network element determines that the terminal device is in the first connection status in the first network, the access management network element sends information about the first connection status to a data management network element. The data management network element performs a service request procedure of the terminal device in the second network based on the information about the first connection status. For example, in the service request procedure, the data management network element decreases a transmission rate of user plane data of the terminal device in the second network by reducing QoS corresponding to the terminal device. Alternatively, the data management network element performs a registration procedure of the terminal device in the second network based on the information about the first connection status. For example, in the registration procedure, the data management network element decreases a transmission rate of user plane data of the terminal device in the second network by reducing QoS corresponding to a service request. If the access management network element determines that the terminal device is in the second connection status in the first network, the access management network element sends information about the second connection status to the data management network element. The data management network element does not restrict the data transmission procedure of the terminal device in the second network.

In the foregoing Manner 1 to Manner 11, the QoS of the session may include the following parameter: an aggregate maximum bit rate (AMBR) of the session, namely, a session- AMBR. The QoS of the terminal device may include the following parameter: a UE-AMBR.

In a possible embodiment of this application, after obtaining the information about the connection status of the terminal device in the first network, the access management network element immediately processes the data transmission procedure of the terminal device in the second network based on the information about the connection status of the terminal device in the first network. For example, if the access management network element obtains that the terminal device is in the first connection status in the first network, the access management network element immediately restricts the data transmission procedure of the terminal device in the second network. In another possible embodiment, after the access management network element obtains the information about the connection status of the terminal device in the first network and duration of the connection status of the terminal device in the first network exceeds specified duration, the access management network element processes the data transmission procedure of the terminal device in the second network based on the information about the connection status of the terminal device in the first network. For example, if the access management network element determines that the terminal device is in the first connection status in the first network, and after the duration of the first connection status of the terminal device exceeds the specified duration, the access management network element restricts the data transmission procedure of the terminal device in the second network. In one embodiment, whether the information about the connection status of the terminal device in the first network exceeds the specified duration may be determined by setting a timer.

In another possible embodiment of this application, a subscription server (for example, a UDM network element) stores subscription information, and the subscription information indicates that the data transmission procedure of the terminal device in the second network needs to be processed based on the information about the connection status of the terminal device in the first network. Correspondingly, in the registration procedure or the session establishment procedure of the terminal device in the second network, if the access management network element obtains the subscription information, the access management network element processes the data transmission procedure of the terminal device in the second network based on the information about the connection status of the terminal device in the first network. If the access management network element obtains no subscription information, the access management network element does not process the data transmission procedure of the terminal device in the second network based on the information about the connection status of the terminal device in the first network.

In this embodiment of this application, the access management network element processes the data transmission procedure of the terminal device in the second network based on the information about the connection status of the terminal device in the first network, and associates a data transmission procedure of the terminal device in the first network with the data transmission procedure of the terminal device in the second network, to avoid a problem that the terminal device overuses a resource in either of the networks when the terminal device needs to transmit data through both the two networks.

The following describes the data transmission method in this application, with reference to FIG. 4A to FIG. 9B by using an example in which a terminal device (a CPE/an RG) accesses a 5G core network through a wireline access network and a 5G access network. In the embodiments corresponding to FIG. 4A to FIG. 9B, for details of content that is the same as that of the first embodiment, refer to related descriptions of the first embodiment.

Figure 4A:
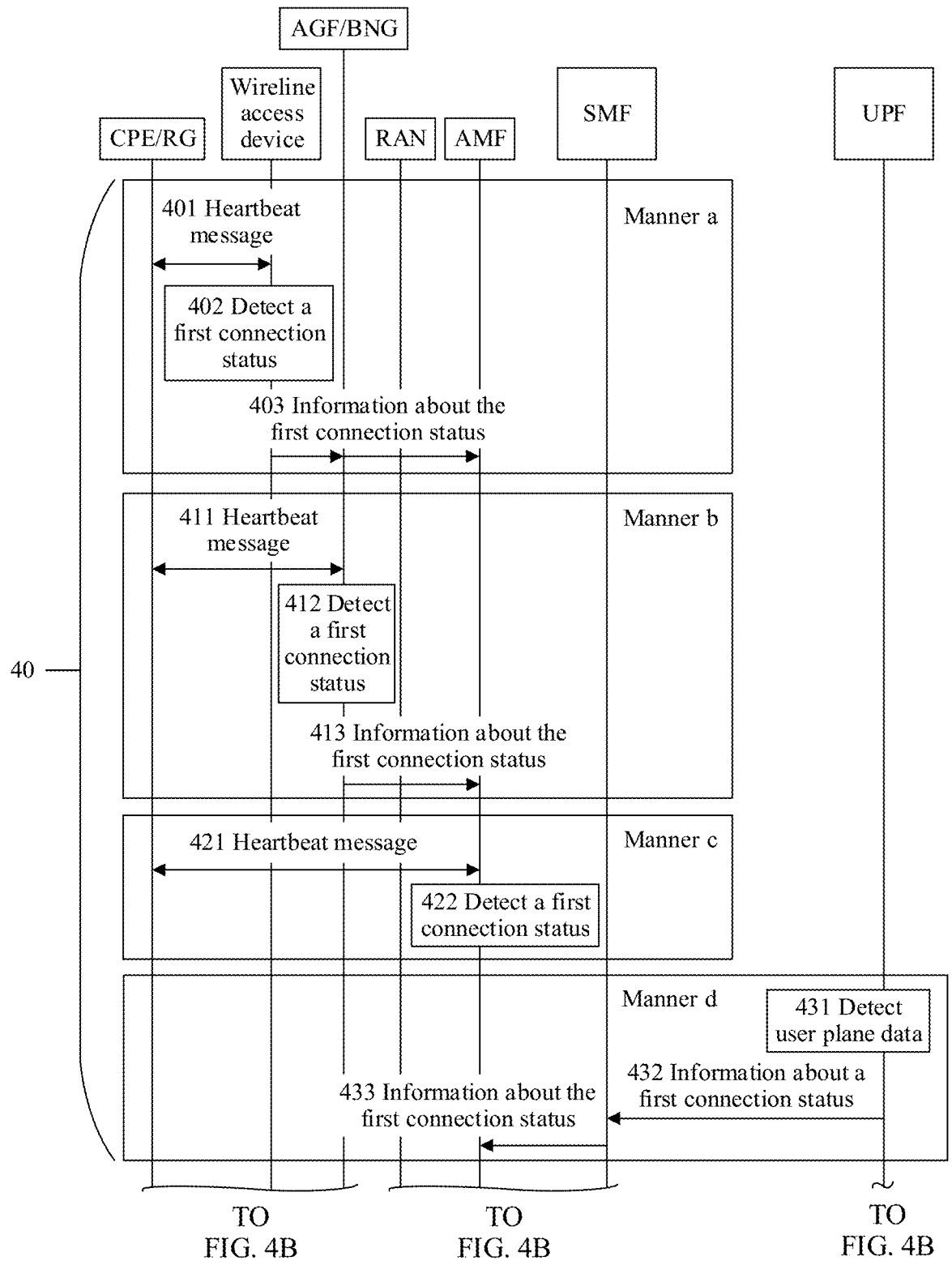
FIG. 4A and FIG. 4B are a schematic flowchart of a data transmission method according to a second embodiment of this application.
Figure 4B:
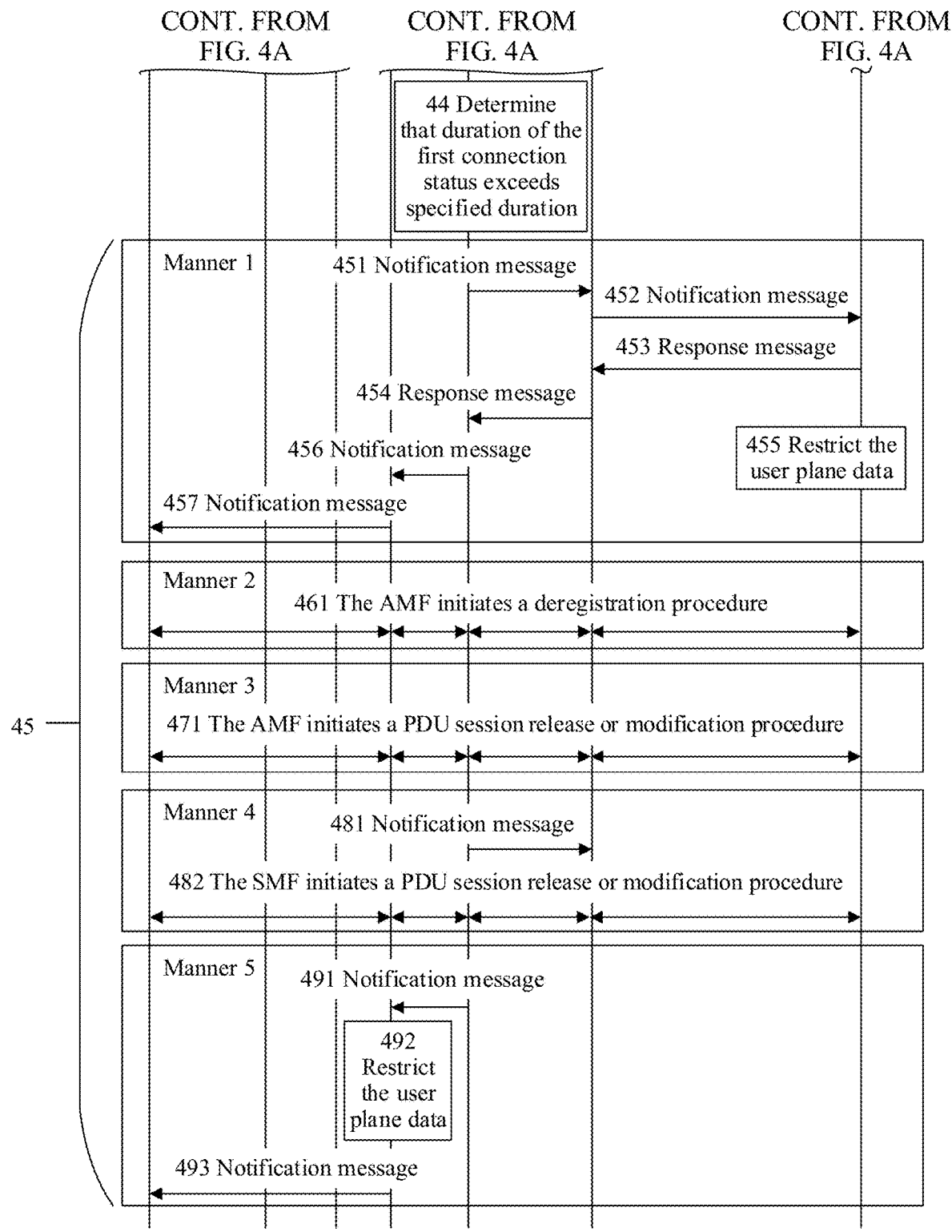

FIG. 4A and FIG. 4B are a flowchart of a data transmission method according to a second embodiment of this application. In this embodiment, the CPE/RG accesses a same AMF network element, a same UPF network element, and a same SMF network element through the wireline access network and the 5G access network. The AMF network element obtains information indicating that the CPE/RG cannot transmit data in the wireline network, for example, a first connection status. The data transmission method in this embodiment includes the following operations:

Operation 40: The AMF network element obtains the first connection status of the CPE/RG in the wireline network.

In this embodiment, the AMF network element may obtain the first connection status of the CPE/RG in the wireline network in at least one of Manner a to Manner d. The following describes Manner a to Manner d in detail.

Manner a

Operation 401: Maintain a heartbeat message between the CPE/RG and a wireline access device.

Operation 402: The wireline access device detects that the CPE/RG is in the first connection status.

Operation 403: The wireline access device sends, to the AMF network element, information indicating that the CPE/RG is in the first connection status.

Manner b

Operation 411: Maintain a heartbeat message between the CPE/RG and an AGF/a BNG.

Operation 412: The AGF/BNG detects that the CPE/RG is in the first connection status.

Operation 413: The AGF/BNG sends, to the AMF network element, information indicating that the CPE/RG is in the first connection status.

Manner c

Operation 421: Maintain a heartbeat message between the CPE/RG and the AMF network element.

Operation 422: The AMF network element detects that the CPE/RG is in the first connection status.

Manner d

Operation 431: The UPF network element detects user plane data that is to be sent to or that is from the CPE/RG.

In one embodiment, if the UPF network element does not detect, within a preset time period, the user plane data that is to be sent to or that is from the CPE/RG, the UPF network element determines that the CPE/RG is in the first connection status. The preset time period may be implemented by using a timer.

Operation 432: The UPF network element sends, to the SMF network element, information indicating that the CPE/RG is in the first connection status.

Operation 433: The SMF network element sends, to the AMF network element, information indicating that the CPE/RG is in the first connection status.

In this embodiment, in Manner a, Manner b, and Manner c, network elements that detect that the CPE/RG is in the first connection status are different. For embodiments of Manner a, Manner b, and Manner d, refer to the descriptions of Manner 2 in operation 301 in the first embodiment. For an embodiment of Manner c, refer to the descriptions of Manner 1 in operation 301 in the first embodiment.

Operation 44: The AMF network element determines that duration of the first connection status of the CPE/RG exceeds specified duration.

In one embodiment, after obtaining that the CPE/RG is in the first connection status, the AMF network element may start a timer. When the timer overflows, if the CPE/RG is still in the first connection status, the AMF network element determines that the duration of the first connection status of the CPE/RG exceeds the specified duration. Then, the AMF network element may perform operation 45. This operation is an optional operation. In operation 40, if the AMF network element obtains that the CPE/RG is in the first connection status, the AMF network element may alternatively immediately perform operation 45.

Operation 45: The AMF network element restricts a data transmission procedure of the CPE/RG in the 5G network based on the first connection status.

In this embodiment, the AMF network element may restrict the data transmission procedure of the CPE/RG in the 5G network in at least one of Manner 1 to Manner 5. The following describes Manner 1 to Manner 5 in detail.

Manner 1

Operation 451: The AMF network element sends a notification message to the SMF network element.

The notification message notifies the SMF network element that the CPE/RG is in the first connection status. The notification message may include at least one of the following information: identification information (for example, a subscription permanent identifier (SUPI) or a unique temporary identifier (GUTI)), PDU session identifier information, or tunnel information of the CPE/RG.

Operation 452: The SMF network element sends a notification message to the UPF network element.

The notification message notifies the UPF network element that the CPE/RG is in the first connection status. The notification message may include at least one of the following information: identification information (for example, IP address information), PDU session identification information, tunnel information, or filter information of the CPE/RG. The notification message may be the notification message in operation 451, or may be different from the notification message in operation 451. This is not limited herein. The SMF network element may obtain an IP address of the CPE/RG based on the SUPI or the GUTI of the CPE/RG.

The first indication information in the first embodiment of this application may be the notification message in operation 451 and the notification message in operation 452 in this embodiment.

Operation 453: The UPF network element sends a response message for the notification message to the SMF network element.

Operation 454: The SMF network element sends a response message for the notification message to the AMF network element.

The response message may be the response message in operation 453, or may be a message different from the response message in operation 453. This is not limited herein.

Operation 455: The UPF network element restricts the data transmission procedure of the CPE/RG in the 5G network.

The UPF network element restricts uplink and/or downlink data transmission of the CPE/RG in the 5G network. For details about how the UPF network element restricts data transmission of the CPE/RG in the 5G network, refer to the descriptions of Manner 1 in operation 302 in the first embodiment.

Alternatively, operation 455 may be performed before operation 453. This is not limited herein.

Operation 456: The AMF network element sends a notification message to a RAN, where the notification message notifies that the data transmission of the CPE/RG in the 5G network is restricted.

The notification message may include reason information, and the reason information notifies the CPE/RG of a reason why the data transmission of the CPE/RG in the 5G network is restricted. The reason information may be that the CPE/RG is in the first connection status in the wireline network.

Operation 457: The RAN sends a notification message to the CPE/RG.

The notification message notifies that the data transmission of the CPE/RG in the 5G network is restricted. The notification message may include reason information, and the reason information notifies the CPE/RG of a reason why the data transmission of the CPE/RG in the 5G network is restricted. The reason information may be that the CPE/RG is in the first connection status in the wireline network.

The notification message may be the notification message in operation 456, or may be different from the notification message in operation 456. This is not limited herein.

For details of same content between Manner 1 in this embodiment and Manner 1 in operation 302 in the first embodiment, refer to the descriptions of the first embodiment, and details are not described herein again.

Manner 2

Operation 461: The AMF network element initiates a deregistration procedure to the CPE/RG in the 5G network.

By initiating the registration procedure, the AMF network element may reject data transmission of the CPE/RG in the 5G network.

Manner 3

Operation 471: The AMF network element initiates a PDU session release procedure or a PDU session modification procedure to the CPE/RG in the 5G network.

By initiating the PDU session release procedure, the AMF network element may reject data transmission of the CPE/RG in the 5G network.

By initiating the PDU session modification procedure, the AMF network element may decrease a data transmission rate of the CPE/RG in the 5G network.

For details of same content between Manner 3 in this embodiment and Manner 3 in operation 302 in the first embodiment, refer to the descriptions of the first embodiment, and details are not described herein again.

Manner 4

Operation 481: The AMF network element sends a notification message to the SMF network element.

For content of the notification message, refer to the notification message in operation 451. The second indication information in the first embodiment may be the notification message.

For details of same content between Manner 4 in this embodiment and Manner 4 in operation 302 in the first embodiment, refer to the descriptions of the first embodiment, and details are not described herein again.

Operation 482: The SMF network element initiates a PDU session release procedure or a PDU session modification procedure to the CPE/RG in the 5G network.

By initiating the PDU session release procedure, the SMF network element may reject data transmission of the CPE/RG in the 5G network.

By initiating the PDU session modification procedure, the SMF network element may decrease a data transmission rate of the CPE/RG in the 5G network.

Manner 5

Operation 491: The AMF network element sends a notification message to a RAN.

The notification message notifies the RAN network element that the CPE/RG is in the first connection status. For descriptions of the notification message, refer to the descriptions of operation 451.

The first indication information in the first embodiment may be the notification message.

Operation 492: The RAN restricts the data transmission procedure of the CPE/RG in the 5G network.

For details of this operation, refer to the descriptions that the UPF network element restricts the data transmission procedure of the CPE/RG in the 5G network in operation 455.

Operation 493: The RAN sends a notification message to the CPE/RG.

For descriptions of the notification message, refer to the descriptions of operation 457.

In this embodiment, the AMF network element processes the data transmission procedure of the CPE/RG in the 5G network based on the connection status of the CPE/RG in the wireline network. After data transmission of the CPE/RG in the wireline network is interrupted, the AMF network element restricts the data transmission procedure of the CPE/RG in the 5G network, to avoid a case in which the CPE/RG overuses a 5G resource.

Figure 5A:
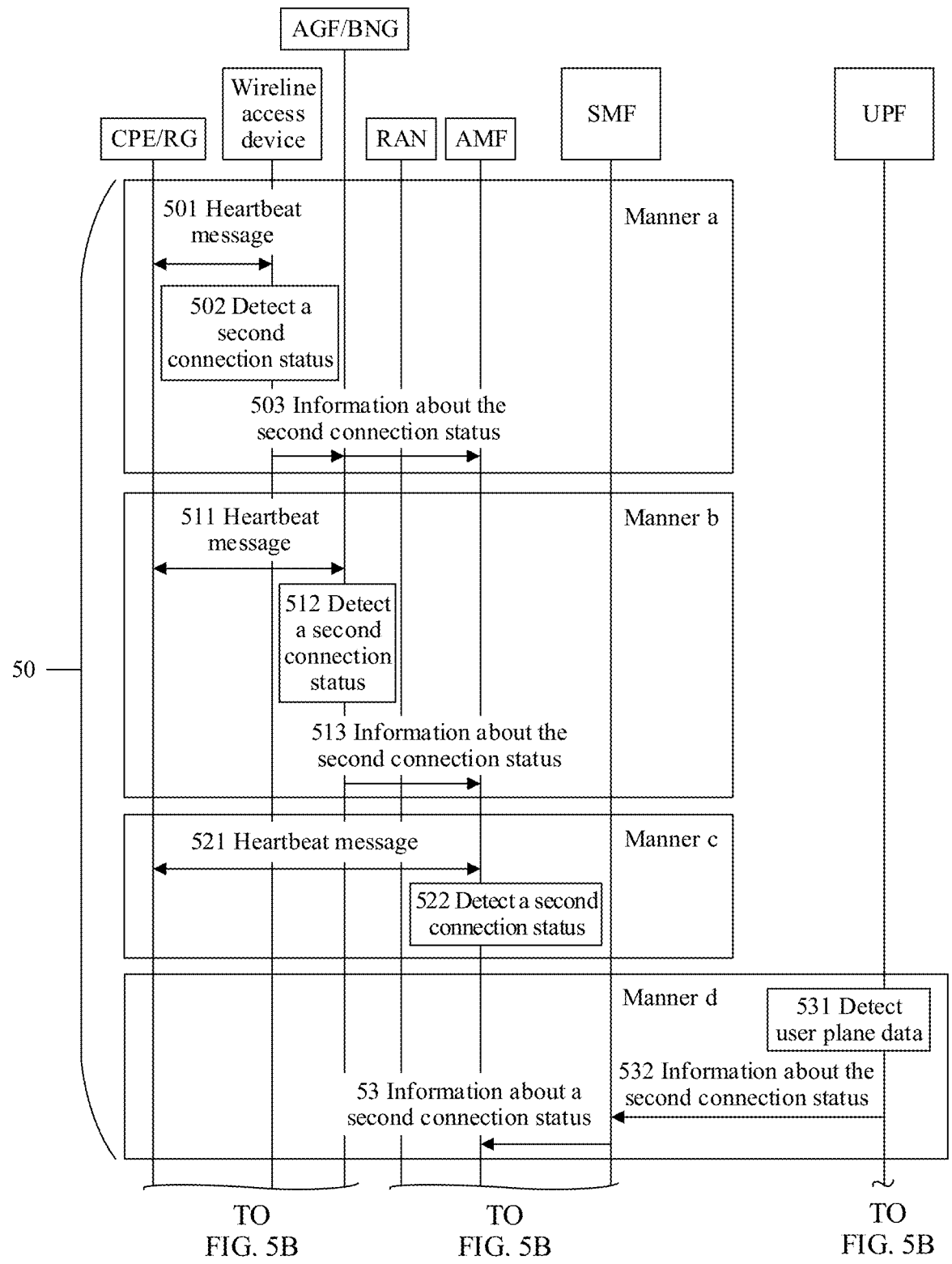
FIG. 5A and FIG. 5B are a schematic flowchart of a data transmission method according to a third embodiment of this application.
Figure 5B:
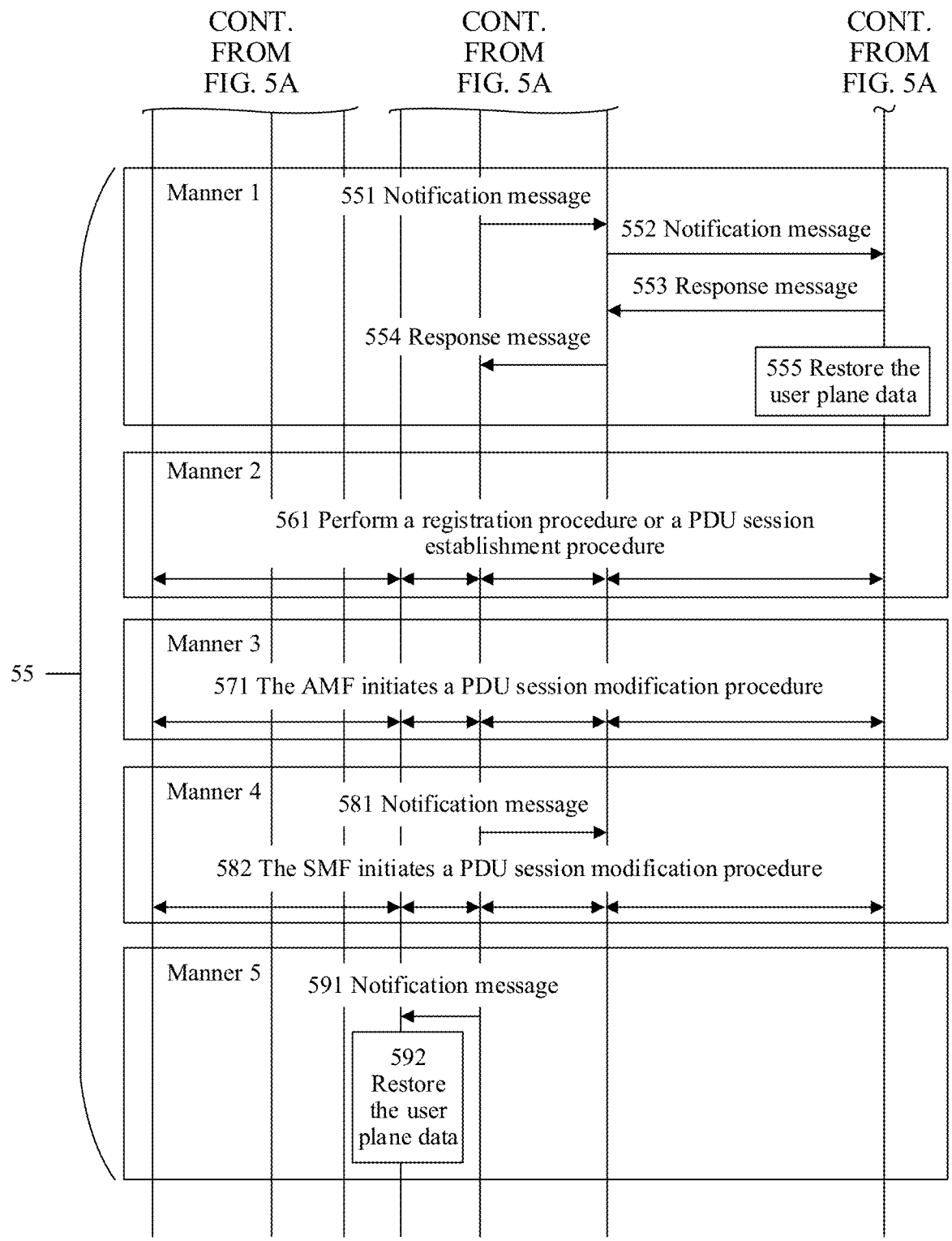

FIG. 5A and FIG. 5B are a flowchart of a data transmission method according to a third embodiment of this application. In this embodiment, a CPE/RG accesses a same AMF network element, a same UPF network element, and a same SMF network element through a wireline access network and a 5G access network. The AMF network element obtains information indicating that the CPE/RG can transmit data in the wireline network, for example, a second connection status. The data transmission method in this embodiment includes the following operations.

Operation 50: The AMF network element obtains the second connection status of the CPE/RG in the wireline network.

In this embodiment, the AMF network element may obtain the second connection status of the CPE/RG in the wireline network in at least one of Manner a to Manner d. The following describes Manner a to Manner d in detail.

Manner a

Operation 501: Maintain a heartbeat message between the CPE/RG and a wireline access device.

Operation 502: The wireline access device detects that the CPE/RG is in the second connection status.

Operation 503: The wireline access device sends, to the AMF network element, information indicating that the CPE/RG is in the second connection status.

Manner b

Operation 511: Maintain a heartbeat message between the CPE/RG and an AGF/a BNG.

Operation 512: The AGF/BNG detects that the CPE/RG is in the second connection status.

Operation 513: The AGF/BNG sends, to the AMF network element, information indicating that the CPE/RG is in the second connection status.

Manner c

Operation 521: Maintain a heartbeat message between the CPE/RG and the AMF network element.

Operation 522: The AMF network element detects that the CPE/RG is in the second connection status.

Manner d

Operation 531: The UPF network element detects user plane data that is to be sent to or that is from the CPE/RG.

In one embodiment, if the UPF network element detects, within a preset time period, the user plane data that is to be sent to or that is from the CPE/RG, the UPF network element determines that the CPE/RG is in the second connection status. The preset time period may be implemented by using a timer.

Operation 532: The UPF network element sends, to the SMF network element, information indicating that the CPE/RG is in the second connection status.

Operation 533: The SMF network element sends, to the AMF network element, the information indicating that the CPE/RG is in the second connection status.

In this embodiment, in Manner a, Manner b, and Manner c, network elements that detect that the CPE/RG is in the second connection status are different. For embodiments of Manner a, Manner b, and Manner d, refer to the descriptions of Manner 2 in operation 301 in the first embodiment. For an embodiment of Manner c, refer to the descriptions of Manner 1 in operation 301 in the first embodiment.

Operation 55: The AMF network element resumes a data transmission procedure of the CPE/RG in the 5G network.

In this embodiment, if the AMF network element restricts the data transmission procedure of the CPE/RG in the 5G network, the AMF network element may resume the data transmission procedure of the CPE/RG in the 5G network in at least one of Manner 1 to Manner 5. The following describes Manner 1 to Manner 5 in detail.

Manner 1

Operation 551: The AMF network element sends a notification message to the SMF network element.

The notification message notifies the SMF network element that the CPE/RG is in the second connection status. The notification message may include at least one of the following information: identification information, PDU session identification information, or tunnel information of the CPE/RG.

Operation 552: The SMF network element sends a notification message to the UPF network element.

The notification message notifies the UPF network element that the CPE/RG is in the second connection status. The notification message may include at least one of the following information: identification information, PDU session identification information, tunnel information, or filter information of the CPE/RG. The notification message may be the notification message in operation 551, or may be different from the notification message in operation 551. This is not limited herein. The SMF network element may obtain an IP address of the CPE/RG based on a SUPI or a GUTI of the CPE/RG.

The third indication information in the first embodiment of this application may be the notification message in operation 551 and the notification message in operation 552 in this embodiment.

Operation 553: The UPF network element sends a response message for the notification message to the SMF network element.

Operation 554: The SMF network element sends a response message for the notification message to the AMF network element.

The response message may be the response message in operation 553, or may be a message different from the response message in operation 553. This is not limited herein.

Operation 555: The UPF network element resumes the data transmission procedure of the CPE/RG in the 5G network.

The UPF network element resumes uplink and/or downlink data transmission of the CPE/RG in the 5G network. For details about how the UPF network element resumes data transmission of the CPE/RG in the 5G network, refer to the descriptions of Manner 5 in operation 302 in the first embodiment.

Alternatively, operation 555 may be performed before operation 553. This is not limited herein.

For details of same content between Manner 1 in this embodiment and Manner 5 in operation 302 in the first embodiment, refer to the descriptions of the first embodiment, and details are not described herein again.

Manner 2

Operation 561: The AMF network element performs a registration procedure or a PDU session establishment procedure on the CPE/RG in the 5G network.

If the AMF network element performs a deregistration procedure on the CPE/RG in the 5G network (referring to operation 461), after the CPE/RG enters the second connection status, the AMF network element performs the registration procedure on the CPE/RG in the 5G network.

Figure 6:
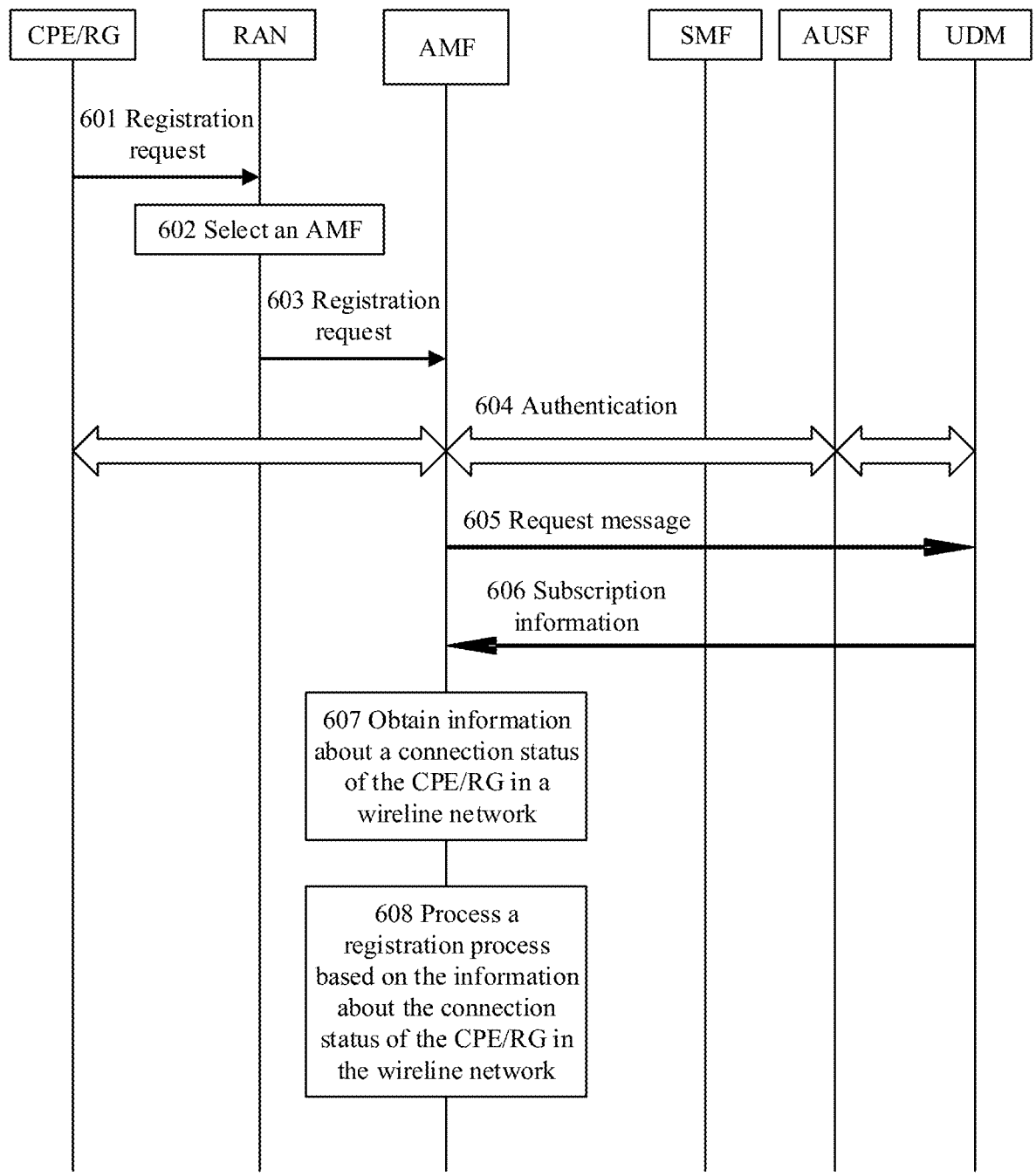
FIG. 6 is a schematic diagram of a registration procedure of a CPE/an RG in a 5G network according to an embodiment of this application.

For the performing, by the AMF network element, a registration procedure on the CPE/RG in the 5G network, refer to the descriptions of FIG. 6.

If the AMF network element performs a PDU session release procedure on the CPE/RG in the 5G network (referring to operation 471), after the CPE/RG enters the second connection status, the AMF network element performs the PDU session establishment procedure on the CPE/RG in the 5G network.

Figure 7:
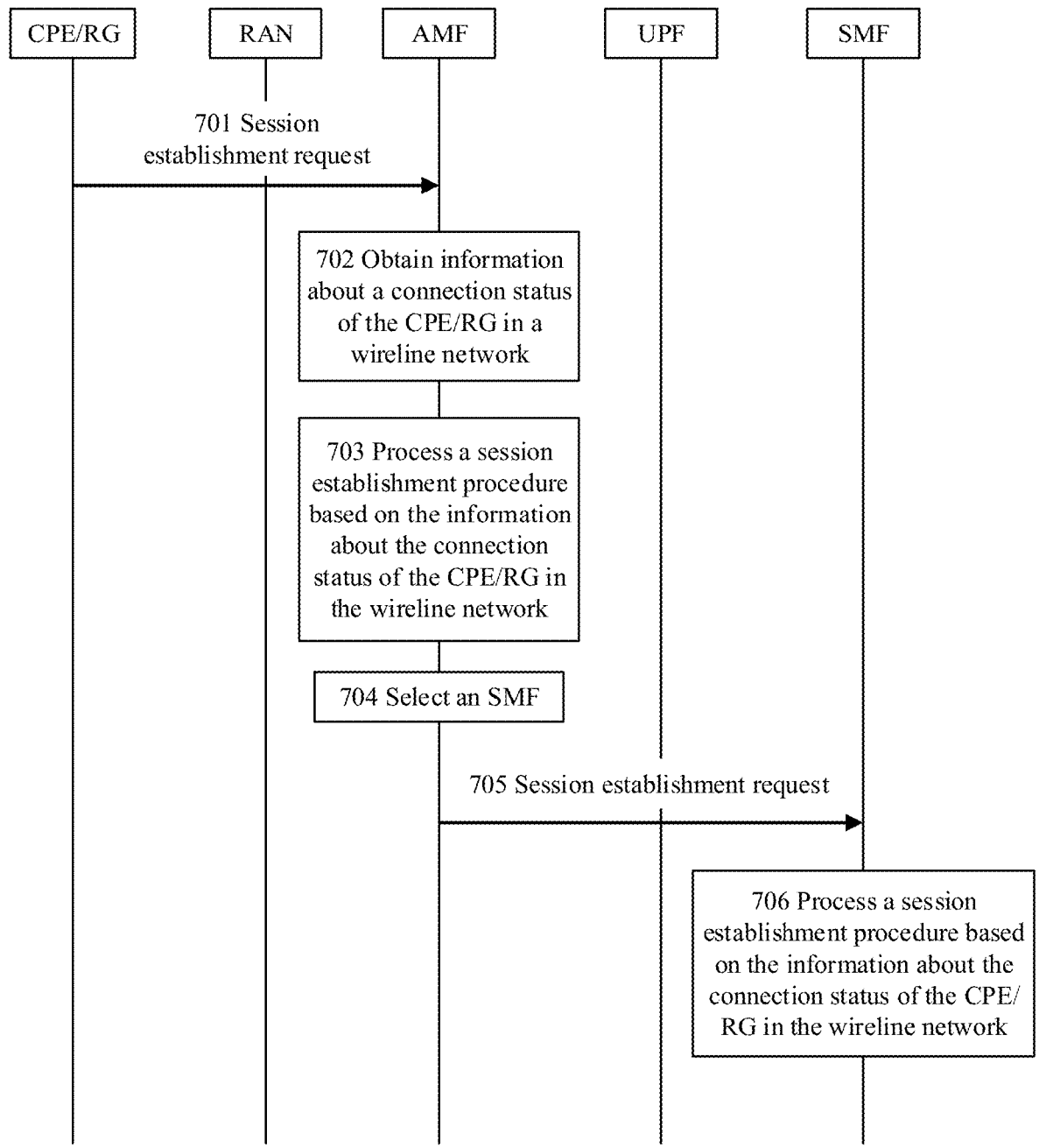
FIG. 7 is a schematic diagram of a session establishment procedure of a CPE/an RG in a 5G network according to an embodiment of this application.

For the performing, by the AMF network element, the PDU session establishment procedure on the CPE/RG in the 5G network, refer to the descriptions of FIG. 7.

Manner 3

Operation 571: The AMF network element initiates a PDU session modification procedure to the CPE/RG in the 5G network.

By initiating the PDU session modification procedure, the AMF network element may increase a data transmission rate of the CPE/RG in the 5G network.

For details of same content between Manner 3 in this embodiment and Manner 6 in operation 302 in the first embodiment, refer to the descriptions of the first embodiment, and details are not described herein again.

Manner 4

Operation 581: The AMF network element sends a notification message to the SMF network element.

For content of the notification message, refer to the notification message in operation 551. The fourth indication information in the first embodiment may be the notification message.

For details of same content between Manner 4 in this embodiment and Manner 7 in operation 302 in the first embodiment, refer to the descriptions of the first embodiment, and details are not described herein again.

Operation 582: The SMF network element initiates a PDU session modification procedure to the CPE/RG in the 5G network.

Content of this operation is similar to that of operation 571. For details, refer to the detailed descriptions of operation 571.

Manner 5

Operation 591: The AMF network element sends a notification message to a RAN.

The notification message notifies the RAN network element that the CPE/RG is in the second connection status. For details of the notification message, refer to the descriptions of operation 551.

The third indication information in the first embodiment may be the notification message.

Operation 592: The RAN resumes the data transmission procedure of the CPE/RG in the 5G network.

Content of this operation is similar to that of operation 555. For details, refer to the descriptions of operation 555.

FIG. 6 is a schematic diagram of a registration procedure of a CPE/an RG in a 5G network. When the CPE/RG has accessed a wireline network and needs to transmit data through the 5G network, the CPE/RG initiates a registration procedure in the 5G network. In one embodiment, the registration procedure includes the following operations.

Operation 601: The CPE/RG sends a registration request.

In one embodiment, the CPE/RG sends the registration request to a RAN.

Operation 602: The RAN selects a to-be-accessed AMF network element.

Operation 603: The RAN sends the registration request to the selected AMF network element.

Operation 604: Perform security verification/authentication on the CPE/RG.

For content of operation 601 to operation 604, refer to an existing procedure of initiating a registration request by a terminal.

Operation 605: The AMF network element sends a request message to a UDM network element.

The request message is used to request subscription information of the CPE/RG.

In a possible embodiment, the UDM network element stores the subscription information, and the subscription information indicates that a data transmission procedure in the 5G network needs to be processed based on a connection status of the CPE/RG in the wireline network. The UDM network element may further store other subscription information. For details, refer to the prior art. This is not limited herein.

Operation 606: The UDM network element sends the subscription information to the AMF network element.

Operation 607: The AMF network element obtains the connection status of the CPE/RG in the wireline network.

The connection status of the CPE/RG in the wireline network includes a first connection status and a second connection status. For details about obtaining the first connection status of the CPE/RG in the wireline network by the AMF network element, refer to the descriptions of operation 40 in the second embodiment of this application. For details about obtaining the second connection status of the CPE/RG in the wireline network by the AMF network element, refer to the descriptions of operation 50 in the third embodiment of this application.

Operation 608: The AMF network element processes the registration procedure based on the connection status of the CPE/RG in the wireline network.

In one embodiment, if the CPE/RG is in the first connection status in the wireline network, the AMF network element rejects the registration procedure. If the CPE/RG is in the second connection status in the wireline network, the AMF network element continues to perform the registration procedure.

FIG. 7 is a schematic diagram of a session establishment procedure of a CPE/RG in a 5G network. When the CPE/RG has accessed a wireline network and needs to transmit data through the 5G network, the CPE/RG initiates a session establishment procedure in the 5G network. In one embodiment, the session establishment procedure includes the following operations.

Operation 701: The CPE/RG sends a session establishment request.

For details of a procedure in which the CPE/RG initiates the session establishment request, refer to an existing session establishment request process.

Operation 702: An AMF network element obtains a connection status of the CPE/RG in the wireline network.

For details, refer to the descriptions of operation 607.

Operation 703: The AMF network element processes the session establishment procedure based on the connection status of the CPE/RG in the wireline network.

In one embodiment, if the CPE/RG is in a first connection status in the wireline network, the AMF network element rejects the PDU session establishment procedure. If the CPE/RG is in a second connection status in the wireline network, the AMF network element continues to perform the session establishment procedure, for example, performs operation 704.

Operation 703 is an optional operation. The connection status of the CPE/RG in the wireline network may alternatively be obtained by an SMF network element. For example, the AMF network element sends the connection status of the CPE/RG in the wireline network to the SMF network element. The SMF network element processes the session establishment procedure based on the connection status of the CPE/RG in the wireline network.

Operation 704: The AMF network element selects an SMF network element.

Operation 705: The AMF network element sends a session establishment request message to the selected SMF network element.

For details of content of operation 704 and operation 705, refer to the existing session establishment procedure. The session establishment request message may carry information about a connection status of the CPE/RG in the wireline network.

Operation 706: The SMF network element processes a session establishment procedure based on the connection status of the CPE/RG in the wireline network.

In one embodiment, if the CPE/RG is in a first connection status in the wireline network, the SMF network element rejects the PDU session establishment procedure. If the CPE/RG is in a second connection status in the wireline network, the SMF network element continues to perform the session establishment procedure.

Figure 8A:
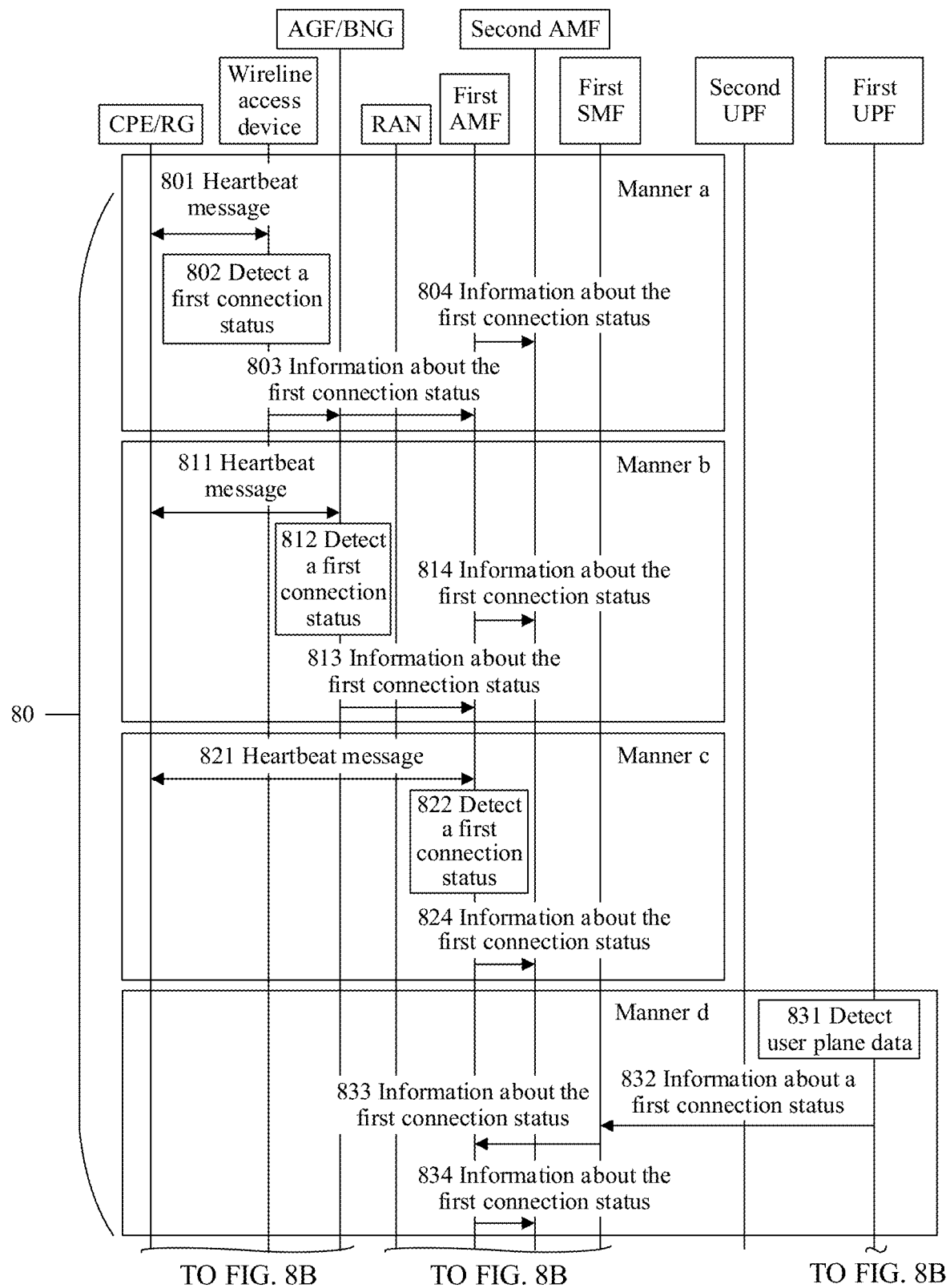
FIG. 8A and FIG. 8B are a schematic flowchart of a data transmission method according to a fourth embodiment of this application.
Figure 8B:
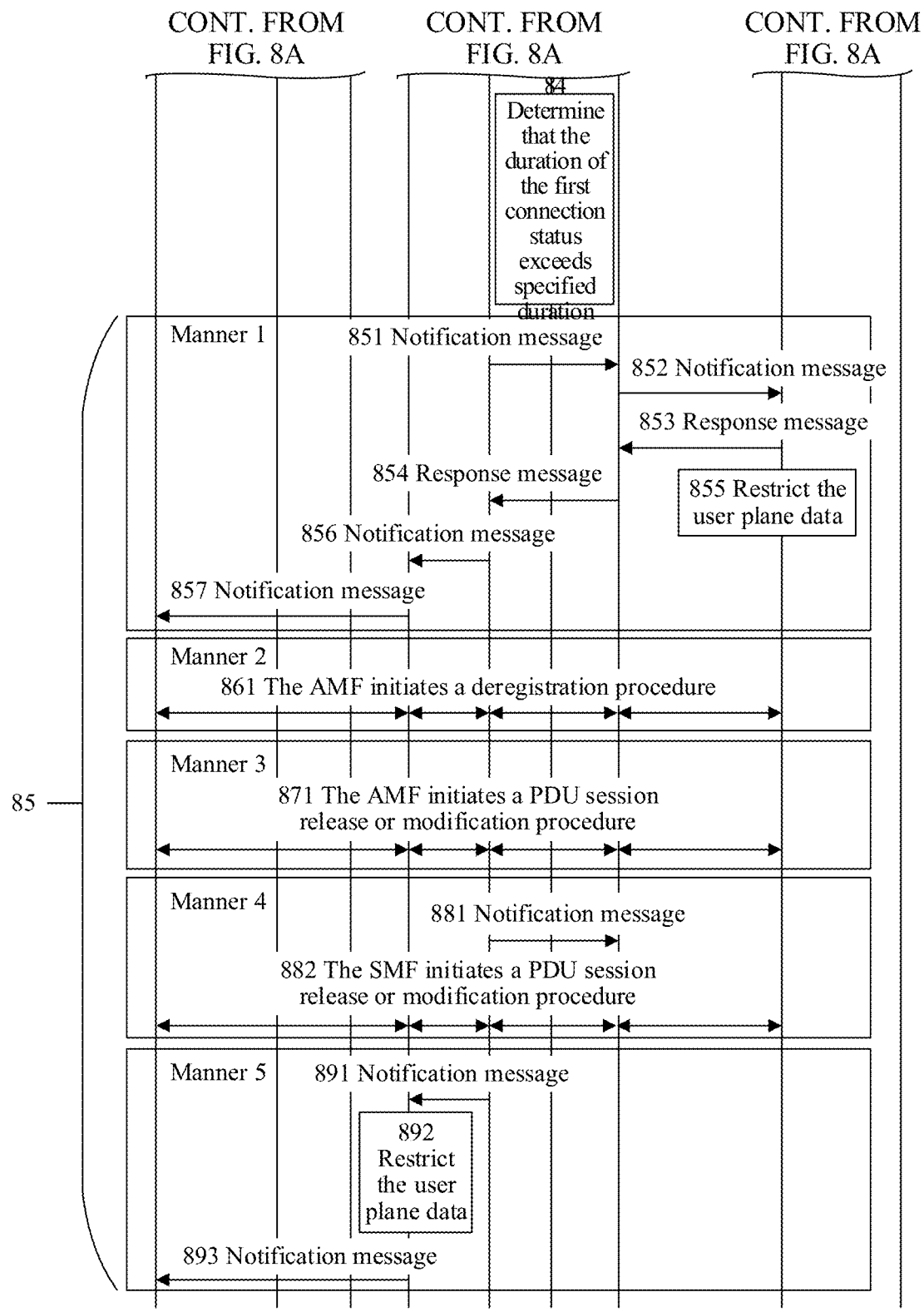

FIG. 8A and FIG. 8B are a flowchart of a data transmission method according to a fourth embodiment of this application. In this embodiment, the CPE/RG accesses different AMF network elements, different UPF network elements, and different SMF network elements through a wireline access network and a 5G access network. The AMF network element obtains information indicating that the CPE/RG cannot transmit data in the wireline network, for example, a first connection status. The data transmission method in this embodiment includes the following operations.

Operation 80: A second AMF network element obtains the first connection status of the CPE/RG in the wireline network.

In this embodiment, the second AMF network element may obtain the first connection status of the CPE/RG in the wireline network in at least one of Manner a to Manner d.

Manner a to Manner c are similar to Manner a to Manner c in the second embodiment, and a difference lies in that a first AMF network element accessed by the CPE/RG in the wireline network obtains information about the first connection status of the CPE/RG in the wireline network. The first AMF network element sends the information about the first connection status to the second AMF network element accessed by the CPE/RG in the 5G network (referring to operation 804, operation 814, or operation 824). Manner d is similar to Manner d in the second embodiment, and a difference lies in that a first UPF network element accessed by the CPE/RG in the wireline network detects user plane data that is to be sent to or that is from the CPE/RG, and determines that the CPE/RG is in the first connection status (referring to operation 831). The first UPF network element sends, through a first SMF network element, information about the first connection status to a first AMF network element accessed by the CPE/RG in the wireline network (referring to operation 832 and operation 833). The first AMF network element sends the information about the first connection status to the second AMF network element accessed by the CPE/RG in the 5G network (referring to operation 834).

Operation 84: The second AMF network element determines that duration of the first connection status of the CPE/RG exceeds specified duration.

Content of this operation is similar to that of operation 44. For details, refer to the descriptions of operation 44.

Operation 85: The second AMF network element restricts a data transmission procedure of the CPE/RG in the 5G network based on the first connection status.

Content of this operation is similar to that of operation 45. For details, refer to the descriptions of operation 45. The UPF network element in operation 45 is the second UPF network element in this embodiment.

Figure 9A:
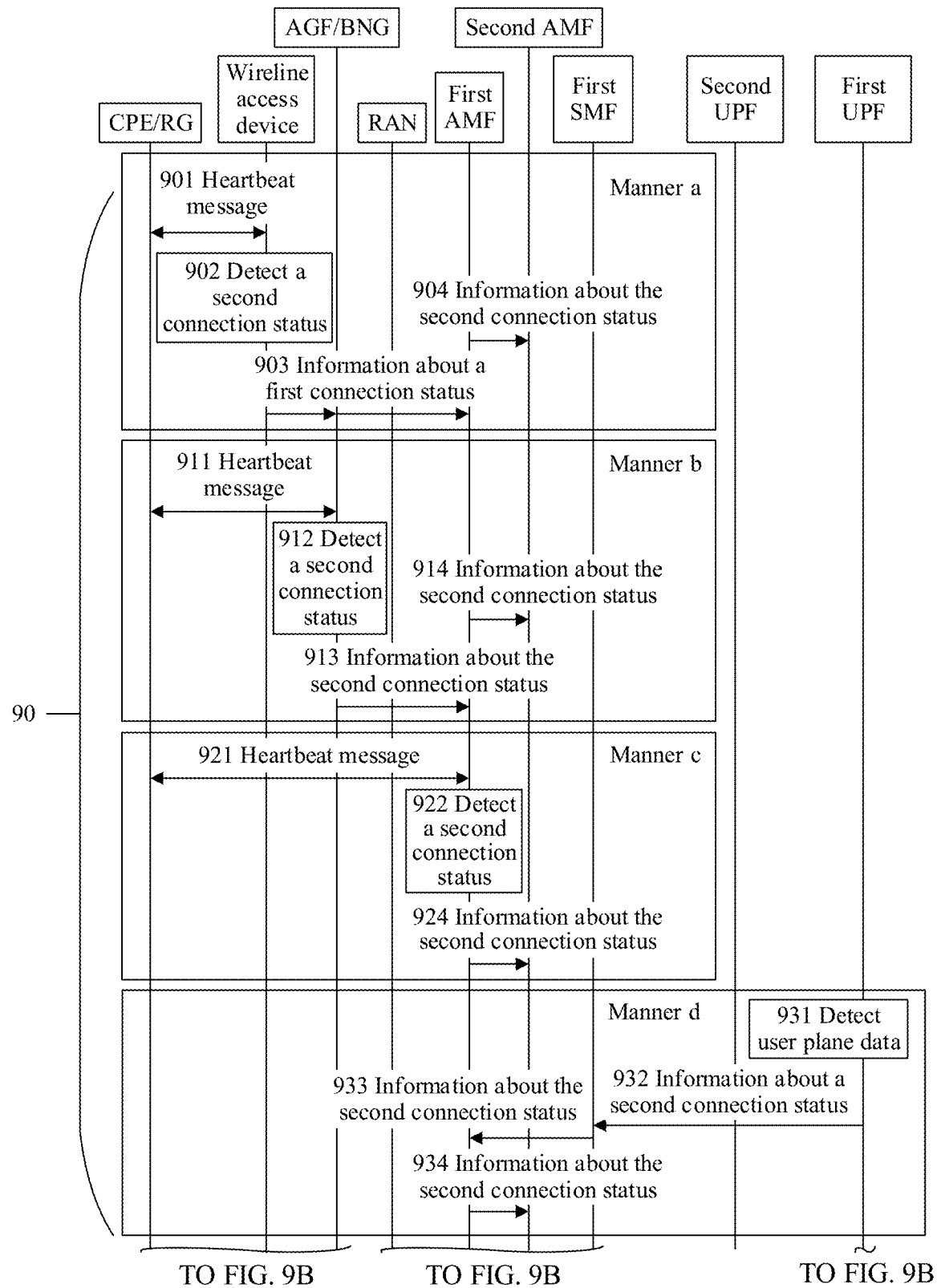
FIG. 9A and FIG. 9B are a schematic flowchart of a data transmission method according to a fifth embodiment of this application.
Figure 9B:
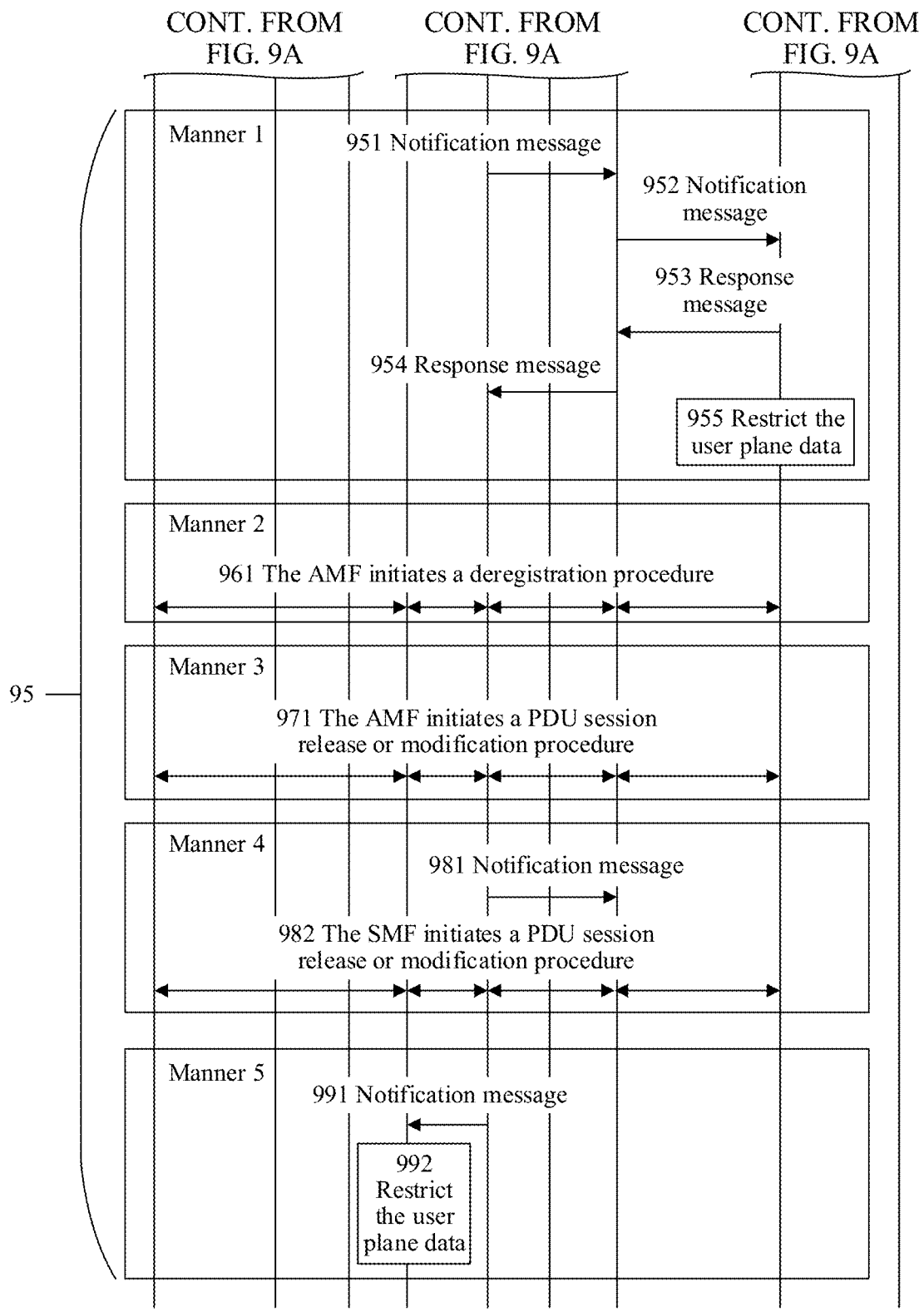

FIG. 9A and FIG. 9B are a flowchart of a data transmission method according to a fifth embodiment of this application. In this embodiment, the CPE/RG accesses different AMF network elements, different UPF network elements, and different SMF network elements through a wireline access network and a 5G access network. The AMF network element obtains information indicating that the CPE/RG can transmit data in the wireline network, for example, a second connection status. The data transmission method in this embodiment includes the following operations.

Operation 90: A second AMF network element obtains the second connection status of the CPE/RG in the wireline network.

In this embodiment, the second AMF network element may obtain the second connection status of the CPE/RG in the wireline network in at least one of Manner a to Manner d.

Manner a to Manner c are similar to Manner a to Manner c in the third embodiment, and a difference lies in that a first AMF network element accessed by the CPE/RG in the wireline network obtains information about the second connection status of the CPE/RG in the wireline network. The first AMF network element sends the information about the second connection status to the second AMF network element accessed by the CPE/RG in the 5G network (referring to operation 904, operation 914, or operation 924). Manner d is similar to Manner d in the second embodiment, and a difference lies in that a first UPF network element accessed by the CPE/RG in the wireline network detects user plane data that is to be sent to or that is from the CPE/RG, and determines that the CPE/RG is in the second connection status (referring to operation 931). The first UPF network element sends, through a first SMF network element, information about the second connection status to a first AMF network element accessed by the CPE/RG in the wireline network (referring to operation 932 and operation 933). The first AMF network element sends the information about the second connection status to the second AMF network element accessed by the CPE/RG in the 5G network (referring to operation 934).

Operation 95: The second AMF network element resumes a data transmission procedure of the CPE/RG in 5G.

Content of this operation is similar to that of operation 55. For details, refer to the descriptions of operation 55. The UPF network element in operation 55 is the second UPF network element in this embodiment.

Figure 10:
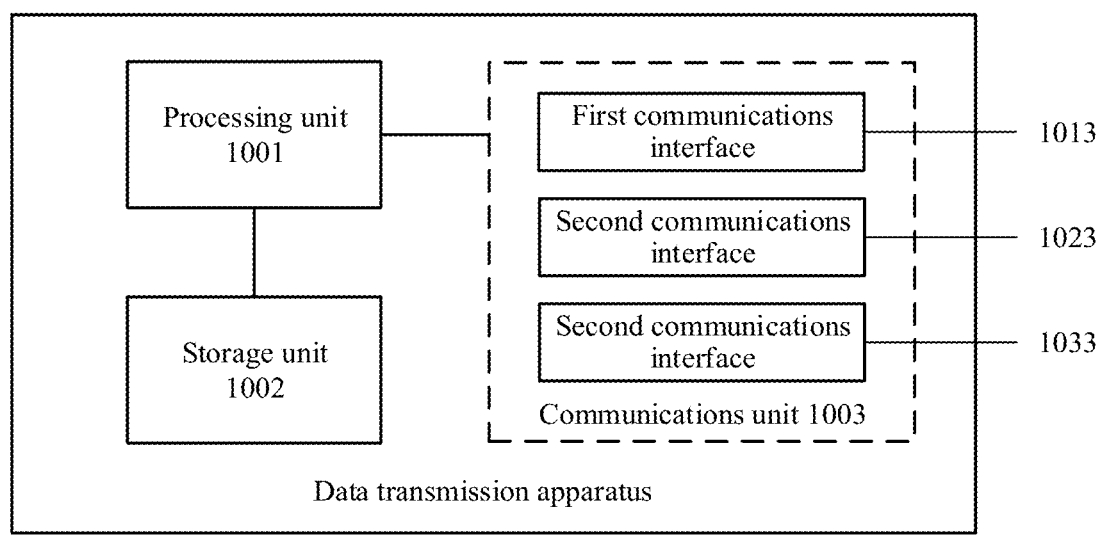
FIG. 10 is a schematic diagram of a data transmission apparatus according to an embodiment of this application.

FIG. 10 is a schematic diagram of a data transmission apparatus according to an embodiment of this application. The data transmission apparatus includes a processing unit 1001, a storage unit 1002, and a communications unit 1003. The processing unit 1001, the storage unit 1002, and the communications unit 1003 may be physically separated units, or may be integrated into one or more physical units. This is not limited herein.

The processing unit 1001 is used by the apparatus to process data. The processing unit 1001 may be a processing circuit or may be a processor. The processor may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

Although FIG. 10 shows only one processing unit 1001, the apparatus may include a plurality of processing units, or the processing unit 1001 includes a plurality of data processing subunits. In one embodiment, the processor may be a single-core (single-CPU) processor, or may be a multi-core (multi-CPU) processor.

The storage unit 1002 is configured to store a computer instruction to be executed by the processing unit 1001. The storage unit 1002 may be a storage circuit or may be a memory. The memory may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache.

The storage unit 1002 may be a unit independent of the processing unit 1001, or may be a storage unit in the processing unit 1001. This is not limited herein. Although FIG. 10 shows only one storage unit, the apparatus may alternatively include a plurality of storage units, or the storage unit 1002 includes a plurality of storage subunits.

The communications unit 1003 is configured to exchange content between the processing unit 1001 and another unit or network element. In one embodiment, the communications unit 1003 may be a communications interface, or may be a transceiver circuit or a transceiver, or may be a transceiver receiver set of the apparatus. The communications unit 1003 may alternatively be a communications interface or a transceiver circuit of the processing unit 1001. Optionally, the communications unit 1003 may be a transceiver chip. The communications unit 1003 may alternatively include a sending unit and/or a receiving unit. In a possible embodiment, the communications unit 1003 may include at least one communications interface. In another possible embodiment, the communications unit 1003 may alternatively be a unit implemented in a form of software.

In the embodiments of this application, the processing unit 1001 may interact with another unit or network element by using the communications unit 1003. For example, the processing unit 1001 obtains or receives content from another network element by using the communications unit 1003. If the processing unit 1001 and the communications unit 1003 are two physically separated components, the processing unit 1001 may exchange content with another unit of the apparatus without using the communications unit 1003.

In a possible embodiment, the processing unit 1001, the storage unit 1002, and the communications unit 1003 may be connected to each other by using a bus. The bus may be a peripheral component interconnect (PCI) bus, an extended industry standard architecture (EISA) bus, or the like. The bus may be classified into an address bus, a data bus, a control bus, and the like.

In this embodiment of this application, the processing unit 1001 implements the methods in FIG. 3 to FIG. 9B of this application according to the computer instruction stored in the storage unit 1002.

In one embodiment, the data transmission apparatus may be an access management network element, for example, an AMF network element. The communications unit may include a first communications interface 1013, a second communications interface 1023, and a third communications interface 1033. In one embodiment, the first communications interface 1013 is configured to be in communication connection to a wireline access network device; the second communications interface 1023 is configured to be in communication connection to a radio access network device; and the third communications interface 1033 is configured to be in communication connection to a session management network element.

The processing unit 1001 is configured to obtain information about a connection status of a terminal device in a first network. The processing unit 1001 is further configured to process a data transmission procedure of the terminal device in a second network based on the information about the connection status of the terminal device in the first network.

In a possible embodiment, the connection status of the terminal device in the first network includes a deregistered state, a data transmission idle state, or a state in which the terminal device is physically disconnected from an access network; and the processing unit 1001 is configured to: restrict the data transmission procedure of the terminal device in the second network; or when duration of the connection status of the terminal device in the first network exceeds specified duration, restrict the data transmission procedure of the terminal device in the second network.

In a possible embodiment, the processing unit 1001 is configured to: initiate a deregistration procedure of the terminal device in the second network; or initiate a PDU session release procedure or a PDU session modification procedure of the terminal device in the second network.

In a possible embodiment, the processing unit 1001 is configured to: reject a registration procedure of the terminal device in the second network; or reject a session establishment procedure of the terminal device in the second network.

In a possible embodiment, the communications unit 1003 is configured to send first indication information to a user plane data processing network element accessed by the terminal device in the second network, where the first indication information indicates the user plane data processing network element to restrict transmission of user plane data that is from the terminal device or that is to be sent to the terminal device. In one embodiment, when the user plane data processing network element is a UPF network element, the third communications interface 1033 in the communications unit 1003 is configured to send the first indication information to the user plane data processing network element accessed by the terminal device in the second network; or when the user plane data processing network element is a radio access network device, the second communications interface 1023 in the communications unit 1003 is configured to send the first indication information to the user plane data processing network element accessed by the terminal device in the second network. The first indication information includes at least one of the following information: identification information of the terminal device, PDU session information of the terminal device in the second network, or data tunnel information of the terminal device in the second network.

In a possible embodiment, the communications unit 1003 is configured to send second indication information to a session management network element accessed by the terminal device in the second network, where the second indication information indicates the session management network element to initiate a PDU session release procedure or a PDU session modification procedure of the terminal device in the second network. In one embodiment, the third communications interface 1033 in the communications unit 1003 is configured to send the second indication information to the session management network element accessed by the terminal device in the second network.

In a possible embodiment, the processing unit 1001 is further configured to send reason information to the terminal device by using the communications unit 1003, where the reason information notifies the terminal device of a reason why the data transmission procedure of the terminal device in the second network is restricted.

In a possible embodiment, the connection status of the terminal device in the first network includes a registered state, a data transmission connected state, or a state in which the terminal device is physically connected to an access network.

In a possible embodiment, the processing unit 1001 is configured to: resume the data transmission procedure of the terminal device in the second network; or when duration of the connection status of the terminal device in the first network exceeds specified duration, resume the data transmission procedure of the terminal device in the second network.

In a possible embodiment, the communications unit 1003 is configured to send third indication information to a user plane data processing network element accessed by the terminal device in the second network, where the third indication information indicates the user plane data processing network element to send user plane data that is from the terminal device or that is to be sent to the terminal device; or the third indication information indicates the user plane data processing network element to increase a transmission rate of user plane data that is from the terminal device or that is to be sent to the terminal device In one embodiment, when the user plane data processing network element is a UPF network element, the third communications interface 1033 in the communications unit 1003 is configured to send the third indication information to the user plane data processing network element accessed by the terminal device in the second network; or when the user plane data processing network element is a radio access network device, the second communications interface 1023 in the communications unit 1003 is configured to send the third indication information to the user plane data processing network element accessed by the terminal device in the second network.

In a possible embodiment, the processing unit 1001 is configured to initiate a PDU session modification procedure of the terminal device in the second network; or the communications unit 1003 is configured to send fourth indication information to a session management network element accessed by the terminal device in the second network, where the fourth indication information indicates the session management network element to initiate a PDU session modification procedure of the terminal device in the second network. In one embodiment, the third communications interface 1033 in the communications unit 1003 is configured to send the fourth indication information to the session management network element.

In a possible embodiment, the processing unit 1001 is configured to:
perform a registration procedure of the terminal device in the second network; or perform a session establishment procedure of the terminal device in the second network.

In a possible embodiment, the processing unit 1001 is configured to obtain the information about the connection status of the terminal device in the first network according to a heartbeat mechanism; or the communications unit 1003 receives a message from the following network element accessed by the terminal device in the first network: an access network element, an access management network element, or a user plane function network element, where the message includes the information about the connection status of the terminal device in the first network. In one embodiment, the first communications interface 1013 in the communications unit 1003 receives a message from a wireline access network element accessed by the terminal device.

In a possible embodiment, the processing unit 1001 is further configured to obtain subscription information of the data transmission procedure of the terminal device in the second network that needs to be processed based on the information about the connection status of the terminal device in the first network.

In this embodiment, the communications unit 1003 is further configured to implement content receiving and sending operations between the AMF network element and another external network element in the embodiments corresponding to FIG. 4A to FIG. 9B of this application. The processing unit 1001 may implement, by using the communications unit 1003, content receiving and sending operations between the processing unit 1001 and an external network element. The processing unit 1001 performs an operation of the AMF network element in FIG. 4A to FIG. 9B of this application according to the computer instruction stored in the storage unit 1003, for example, obtains the information about the connection status of the terminal device in the first network; and processes the data transmission procedure of the terminal device in the second network based on the information about the connection status of the terminal device in the first network.

In a possible embodiment, the connection status of the terminal device in the first network includes a deregistered state, a data transmission idle state, or a state in which the terminal device is physically disconnected from an access network; and the processing a data transmission procedure of the terminal device in a second network based on the information about the connection status of the terminal device in the first network includes: restricting the data transmission procedure of the terminal device in the second network; or when duration of the connection status of the terminal device in the first network exceeds specified duration, restricting the data transmission procedure of the terminal device in the second network.

In a possible embodiment, the restricting the data transmission procedure of the terminal device in the second network includes:

initiating a deregistration procedure of the terminal device in the second network; or initiating a PDU session release procedure or a PDU session modification procedure of the terminal device in the second network; or rejecting a registration procedure of the terminal device in the second network; or rejecting a session establishment procedure of the terminal device in the second network; or sending the information about the connection status of the terminal device in the first network to a policy control network element by using the communications unit, where the information about the connection status is used by the policy control network element to initiate a PDU session release procedure of the terminal device in the second network; or sending the information about the connection status of the terminal device in the first network to a policy control network element by using the communications unit, where the information about the connection status is used by the policy control network element to reject a session establishment procedure of the terminal device in the second network; or sending the information about the connection status of the terminal device in the first network to a data management network element by using the communications unit, where the information about the connection status is used by the data management network element to perform a deregistration procedure of the terminal device in the second network; or sending, by using the communications unit, the information about the connection status of the terminal device in the first network to a session management network element accessed by the terminal device in the second network, where the information about the connection status is used by the session management network element to initiate a PDU session release procedure of the terminal device in the second network.

In a possible embodiment, the processing unit is further configured to perform the following operation according to the computer instruction stored in the storage unit:

sending reason information to the terminal device by using the communications unit, where the reason information notifies the terminal device of a reason why the data transmission procedure of the terminal device in the second network is restricted.

In a possible embodiment, the connection status of the terminal device in the first network includes a registered state, a data transmission connected state, or a state in which the terminal device is physically connected to an access network; and the processing a data transmission procedure of the terminal device in a second network based on the information about the connection status of the terminal device in the first network includes: resuming the data transmission procedure of the terminal device in the second network; or when duration of the connection status of the terminal device in the first network exceeds specified duration, resuming the data transmission procedure of the terminal device in the second network.

In a possible embodiment, the resuming the data transmission procedure of the terminal device in the second network includes: sending, by using the communications unit, indication information to a user plane data processing network element accessed by the terminal device in the second network, where the indication information indicates the user plane data processing network element to send user plane data that is from the terminal device or that is to be sent to the terminal device.

In a possible embodiment, the processing a data transmission procedure of the terminal device in a second network based on the information about the connection status of the terminal device in the first network includes: initiating a PDU session modification procedure of the terminal device in the second network.

In a possible embodiment, the processing a data transmission procedure of the terminal device in a second network based on the information about the connection status of the terminal device in the first network includes: performing a registration procedure of the terminal device in the second network; or performing a session establishment procedure of the terminal device in the second network; or sending the information about the connection status of the terminal device in the first network to a data management network element by using the communications unit, where the information about the connection status is used by the data management network element to perform a registration procedure of the terminal device in the second network.

In a possible embodiment, the processing a data transmission procedure of the terminal device in a second network based on the information about the connection status of the terminal device in the first network includes: sending, by using the communications unit, the information about the connection status of the terminal device in the first network to a session management network element accessed by the terminal device in the second network, where the information about the connection status is used by the session management network element to perform a PDU session establishment procedure of the terminal in the second network; or the information about the connection status is used by the session management network element to perform a PDU session modification procedure of the terminal in the second network.

In a possible embodiment, the processing a data transmission procedure of the terminal device in a second network based on the information about the connection status of the terminal device in the first network includes: sending the information about the connection status of the terminal device in the first network to a policy control network element by using the communications unit, where the information about the connection status is used by the policy control network element to perform a PDU session establishment procedure of the terminal in the second network; or the information about the connection status is used by the session management network element to perform a PDU session modification procedure of the terminal in the second network.

In a possible embodiment, the processing a data transmission procedure of the terminal device in a second network based on the information about the connection status of the terminal device in the first network includes: sending the information about the connection status of the terminal device in the first network to a data management network element by using the communications unit, where the information about the connection status is used by the data management network element to initiate a subscription update procedure of the terminal device; or the information about the connection status is used by the data management network element to perform a service request procedure of the terminal device in the second network.

In a possible embodiment, the processing a data transmission procedure of the terminal device in a second network based on the information about the connection status of the terminal device in the first network includes: sending, by using the communications unit, indication information to a user plane data processing network element accessed by the terminal device in the second network, where the indication information indicates the user plane data processing network element to adjust transmission of user plane data that is from the terminal device or that is to be sent to the terminal device.

In a possible embodiment, the indication information includes at least one of the following information: identification information of the terminal device, PDU session information of the terminal device in the second network, or data tunnel information of the terminal device in the second network.

In a possible embodiment, the obtaining information about a connection status of a terminal device in a first network includes: obtaining the information about the connection status of the terminal device in the first network according to a heartbeat mechanism; or receiving, by using the communications unit, a message from the following network element accessed by the terminal device in the first network: an access network element, an access management network element, the terminal device, or a user plane function network element, where the message includes the information about the connection status of the terminal device in the first network.

In a possible embodiment, the processing unit is further configured to perform the following operation according to the computer instruction stored in the storage unit: obtaining subscription information of the data transmission procedure of the terminal device in the second network that needs to be processed based on the information about the connection status of the terminal device in the first network.

The data transmission apparatus may be a user plane data processing network element, for example, a UPF network element or a radio access network device accessed by a terminal device in a second network.

When the data transmission apparatus is the UPF network element, the first communications interface 1013 is configured to be in communication connection to a wireline access network device; the second communications interface 1023 is configured to be in communication connection to a radio access network device; and the third communications interface 1033 is configured to be in communication connection to a session management network element. When the data transmission apparatus is the radio access network device, the first communications interface 1013 may be a radio transceiver, configured to be in communication connection to a terminal device; the second communications interface 1023 is configured to be in communication connection to a UPF network element; and the third communications interface 1033 is configured to be in communication connection to an access management network element.

In one embodiment, the processing unit 1001 is configured to obtain information about a connection status of the terminal device in a first network. The processing unit 1001 is further configured to process a data transmission procedure of the terminal device in a second network based on the information about the connection status of the terminal device in the first network.

In a possible embodiment, the connection status of the terminal device in the first network includes a deregistered state, a data transmission idle state, or a state in which the terminal device is physically disconnected from an access network; and the processing unit 1001 is configured to restrict the data transmission procedure of the terminal device in the second network.

In a possible embodiment, the processing unit 1001 is configured to: reject transmission of user plane data of the terminal device in the second network; or decrease a transmission rate of user plane data of the terminal device in the second network.

In a possible embodiment, the connection status of the terminal device in the first network includes a registered state, a data transmission connected state, or a state in which the terminal device is physically connected to an access network; and the processing unit 1001 is configured to resume the data transmission procedure of the terminal device in the second network.

In a possible embodiment, the processing unit 1001 is configured to:
 transmit user plane data of the terminal device in the second network; or increase a transmission rate of user plane data of the terminal device in the second network.

In a possible embodiment, the communications unit 1003 is configured to receive the information about the connection status of the terminal device in the first network from the access management network element; or the processing unit 1001 is configured to obtain the information about the connection status of the terminal device in the first network by detecting the user plane data of the terminal device in the first network.

In a possible embodiment, the user plane data processing network element is a user plane function network element accessed by the terminal device in the first network, a user plane function network element accessed by the terminal device in the second network, or an access network device accessed by the terminal device in the second network.

In this embodiment, the communications unit 1003 is further configured to implement content receiving and sending operations between the UPF network element or the RAN and another external network element in the embodiments corresponding to FIG. 4A to FIG. 9B of this application. The processing unit 1001 may implement, by using the communications unit 1003, content receiving and sending operations between the processing unit 1001 and an external network element. The processing unit 1001 performs an operation of the UPF network element or the RAN in FIG. 4A to FIG. 9B of this application according to the computer instruction stored in the storage unit 1003, for example, obtains the information about the connection status of the terminal device in the first network; and processes the data transmission procedure of the terminal device in the second network based on the information about the connection status of the terminal device in the first network.

In a possible embodiment, the connection status of the terminal device in the first network includes a deregistered state, a data transmission idle state, or a state in which the terminal device is physically disconnected from an access network; and the processing a data transmission procedure of the terminal device in a second network based on the information about the connection status of the terminal device in the first network includes: restricting the data transmission procedure of the terminal device in the second network; or when duration of the connection status of the terminal device in the first network exceeds specified duration, restricting the data transmission procedure of the terminal device in the second network.

In a possible embodiment, the restricting the data transmission procedure of the terminal device in the second network includes: rejecting transmission of user plane data of the terminal device in the second network; or decreasing a transmission rate of user plane data of the terminal device in the second network.

In a possible embodiment, the connection status of the terminal device in the first network includes a registered state, a data transmission connected state, or a state in which the terminal device is physically connected to an access network; and the processing a data transmission procedure of the terminal device in a second network based on the information about the connection status of the terminal device in the first network includes: resuming the data transmission procedure of the terminal device in the second network; or when duration of the connection status of the terminal device in the first network exceeds specified duration, resuming the data transmission procedure of the terminal device in the second network.

In a possible embodiment, the resuming the data transmission procedure of the terminal device in the second network includes: transmitting user plane data of the terminal device in the second network; or increasing a transmission rate of user plane data of the terminal device in the second network.

In a possible embodiment, the processing a data transmission procedure of the terminal device in a second network based on the information about the connection status of the terminal device in the first network includes: adjusting, based on the information about the connection status of the terminal device in the first network, transmission of user plane data that is from the terminal device or that is to be sent to the terminal device.

The data transmission apparatus may be a session management network element, for example, an SMF network element accessed by a terminal device in a second network, and the first communications interface 1013 is configured to be in communication connection to a UPF network element; the second communications interface 1023 is configured to be in communication connection to an AMF network element; and the third communications interface 1033 is configured to be in communication connection to an SMF network element accessed by the terminal device in a first network.

In one embodiment, the processing unit 1001 is configured to obtain information about a connection status of the terminal device in the first network. The processing unit 1001 is further configured to process a data transmission procedure of the terminal device in a second network based on the information about the connection status of the terminal device in the first network.

In a possible embodiment, the connection status of the terminal device in the first network includes a deregistered state, a data transmission idle state, or a state in which the terminal device is physically disconnected from an access network; and the processing unit 1001 is configured to restrict the data transmission procedure of the terminal device in the second network.

In a possible embodiment, the processing unit 1001 is configured to: reject transmission of user plane data of the terminal device in the second network; or decrease a transmission rate of user plane data of the terminal device in the second network.

In a possible embodiment, the processing unit 1001 is configured to: perform a session release procedure of the terminal device in the second network; or perform a session modification procedure of the terminal device in the second network.

In a possible embodiment, the connection status of the terminal device in the first network includes a registered state, a data transmission connected state, or a state in which the terminal device is physically connected to an access network; and the processing unit 1001 is configured to resume the data transmission procedure of the terminal device in the second network.

In a possible embodiment, the processing unit 1001 is configured to: resume the user plane data procedure of the terminal device in the second network; or increase a transmission rate of user plane data of the terminal device in the second network.

In a possible embodiment, the processing unit 1001 is configured to: perform a session establishment procedure of the terminal device in the second network; or perform a session modification procedure of the terminal device in the second network.

In a possible embodiment, the communications unit 1003 is configured to receive the information about the connection status of the terminal device in the first network from an access management network element; or In this embodiment, the communications unit 1003 is further configured to implement content receiving and sending operations between the SMF network element and another external network element in the embodiments corresponding to FIG. 4A to FIG. 9B of this application. The processing unit 1001 may implement, by using the communications unit 1003, content receiving and sending operations between the processing unit 1001 and an external network element. The processing unit 1001 performs an operation of the SMF network element in FIG. 4A to FIG. 9B of this application according to the computer instruction stored in the storage unit 1003, for example, obtains the information about the connection status of the terminal device in the first network; and processes the data transmission procedure of the terminal device in the second network based on the information about the connection status of the terminal device in the first network.

In a possible embodiment, the connection status of the terminal device in the first network includes a deregistered state, a data transmission idle state, or a state in which the terminal device is physically disconnected from an access network; and the processing a data transmission procedure of the terminal device in a second network based on the information about the connection status of the terminal device in the first network includes: restricting the data transmission procedure of the terminal device in the second network; or when duration of the connection status of the terminal device in the first network exceeds specified duration, restricting the data transmission procedure of the terminal device in the second network.

In a possible embodiment, the restricting the data transmission procedure of the terminal device in the second network includes: rejecting transmission of user plane data of the terminal device in the second network; or decreasing a transmission rate of user plane data of the terminal device in the second network.

In a possible embodiment, the rejecting transmission of user plane data of the terminal device in the second network includes: performing a session release procedure of the terminal device in the second network; or the decreasing a transmission rate of user plane data of the terminal device in the second network includes: performing a session modification procedure of the terminal device in the second network.

In a possible embodiment, the connection status of the terminal device in the first network includes a registered state, a data transmission connected state, or a state in which the terminal device is physically connected to an access network; and the processing a data transmission procedure of the terminal device in a second network based on the information about the connection status of the terminal device in the first network includes: resuming the data transmission procedure of the terminal device in the second network; or when duration of the connection status of the terminal device in the first network exceeds specified duration, resuming the data transmission procedure of the terminal device in the second network.

In a possible embodiment, the resuming the data transmission procedure of the terminal device in the second network includes: resuming the user plane data procedure of the terminal device in the second network; or increasing a transmission rate of user plane data of the terminal device in the second network.

In a possible embodiment, the resuming the data transmission procedure of the terminal device in the second network includes: performing a session establishment procedure of the terminal device in the second network; or the increasing a transmission rate of user plane data of the terminal device in the second network includes: performing a session modification procedure of the terminal device in the second network.

In a possible embodiment, the obtaining information about a connection status of the terminal device in the first network includes: receiving, by using the communications unit, the information about the connection status of the terminal device in the first network from an access management network element.

In a possible embodiment, the processing a data transmission procedure of the terminal device in a second network based on the information about the connection status of the terminal device in the first network includes: performing a PDU session establishment procedure of the terminal in the second network based on the information about the connection status; or performing, by the session management network element, a PDU session modification procedure of the terminal in the second network based on the information about the connection status.

The data transmission apparatus may be a policy control network element. The processing unit 1001 in the policy control network element performs the following operations according to the computer instruction stored in the storage unit 1003: obtaining information about a connection status of a terminal device in a first network; and processing a data transmission procedure of the terminal device in a second network based on the information about the connection status of the terminal device in the first network.

In a possible embodiment, the processing a data transmission procedure of the terminal device in a second network based on the information about the connection status of the terminal device in the first network includes: performing a PDU session establishment procedure of the terminal in the second network based on the information about the connection status; or performing a PDU session modification procedure of the terminal in the second network based on the information about the connection status.

In a possible embodiment, the processing a data transmission procedure of the terminal device in a second network based on the information about the connection status of the terminal device in the first network includes: initiating a PDU session release procedure of the terminal device in the second network based on the information about the connection status; or rejecting a session establishment procedure of the terminal device in the second network based on the information about the connection status.

The processing unit 1001 may further perform another operation of the policy control network element in the embodiment in FIG. 3 according to the computer instruction stored in the storage unit 1003. For details, refer to the descriptions of the embodiment in FIG. 3.

The data transmission apparatus may be a data management network element. The processing unit 1001 in the data management network element performs the following operations according to the computer instruction stored in the storage unit 1003: obtaining information about a connection status of a terminal device in a first network; and processing a data transmission procedure of the terminal device in a second network based on the information about the connection status of the terminal device in the first network.

In a possible embodiment, the processing a data transmission procedure of the terminal device in a second network based on the information about the connection status of the terminal device in the first network includes: performing a deregistration procedure of the terminal device in the second network based on the information about the connection status.

In a possible embodiment, the processing a data transmission procedure of the terminal device in a second network based on the information about the connection status of the terminal device in the first network includes: initiating a subscription update procedure of the terminal device based on the information about the connection status; or performing a service request procedure of the terminal device in the second network based on the information about the connection status.

In a possible embodiment, the processing a data transmission procedure of the terminal device in a second network based on the information about the connection status of the terminal device in the first network includes: performing a registration procedure of the terminal device in the second network based on the information about the connection status.

The processing unit 1001 may further perform another operation of the data management network element in the embodiment in FIG. 3 according to the computer instruction stored in the storage unit 1003. For details, refer to the descriptions of the embodiment in FIG. 3.

In this embodiment of this application, the first network is a non-3GPP network, and the second network is a 3GPP network; or the first network is a wireline network, and the second network is a wireless network; or both the first network and the second network are non-3GPP networks; or both the first network and the second network element are 3GPP networks.

In the embodiments of this application, for ease of understanding, a plurality of examples are used for description. However, these examples are merely examples, but this does not mean that these examples are optimal embodiments for implementing this application.

In the embodiments of this application, for ease of description, a request message, a response message, and names of various other messages are used. However, these messages are merely used as examples to describe content that needs to be carried or a function that needs to be implemented. Specific names of the messages constitute no limitation on this application. For example, the messages may alternatively be a first message, a second message, and a third message. These messages may be some specific messages, or may be some fields in the messages. These messages may alternatively represent various service-based operations.

All or some of the foregoing embodiments may be implemented by using software, hardware, firmware, or any combination thereof. When software is used to implement the embodiments, the embodiments may be implemented completely or partially in a form of a computer program product. The computer program product may include one or more computer instructions. When the computer program instructions are loaded and executed on a computer, the procedures or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wireline (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic disk), an optical medium (for example, a DVD), a semiconductor medium (for example, a solid-state drive (SSD), or the like.

A person of ordinary skill in the art may be aware that, in combination with the examples described in the embodiments disclosed in this specification, units and algorithm operations can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the foregoing method embodiments. This is not limited herein.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory, a random access memory, a magnetic disk, or an optical disc.

The foregoing descriptions are merely embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method comprising:
obtaining, by an access management network element, information about a first connection status of a terminal device in a first network, wherein the first connection status of the terminal device comprises a deregistered state, a data transmission idle state, or a state wherein the terminal device is physically disconnected from an access network in the first network;
restricting, by the access management network element, a data transmission procedure of the terminal device in a second network based on the information about the first connection status of the terminal device in the first network; and
resuming, by the access management network element, the data transmission procedure of the terminal device in the second network when the first connection status of the terminal device in the first network changes to a second connection status, wherein the second connection status of the terminal device in the first network comprises a registered state or a data transmission connected state.

2. The method according to claim 1, wherein
the restricting, by the access management network element, a data transmission procedure of the terminal device in a second network based on the information about the first connection status of the terminal device in the first network, comprises:
when a duration of the first connection status of the terminal device in the first network exceeds a specified duration, restricting, by the access management network element, the data transmission procedure of the terminal device in the second network.

3. The method according to claim 1, wherein the restricting, by the access management network element, the data transmission procedure of the terminal device in the second network comprises one of:
   initiating, by the access management network element, a deregistration procedure of the terminal device in the second network; or
   initiating, by the access management network element, a packet data unit (PDU) session release procedure of the terminal device in the second network; or
   rejecting, by the access management network element, a registration procedure of the terminal device in the second network; or
   rejecting, by the access management network element, a session establishment procedure of the terminal device in the second network; or
   sending, by the access management network element, the information about the first connection status of the terminal device in the first network to a policy control network element, wherein the information about the first connection status is used by the policy control network element to initiate a PDU session release procedure of the terminal device in the second network; or
   sending, by the access management network element, the information about the first connection status of the terminal device in the first network to a policy control network element, wherein the information about the first connection status is used by the policy control network element to reject a session establishment procedure of the terminal device in the second network; or
   sending, by the access management network element, the information about the first connection status of the terminal device in the first network to a data management network element, wherein the information about the first connection status is used by the data management network element to perform a deregistration procedure of the terminal device in the second network; or
   sending, by the access management network element, the information about the first connection status of the terminal device in the first network to a session management network element accessed by the terminal device in the second network, wherein the information about the first connection status is used by the session management network element to initiate a PDU session release procedure of the terminal device in the second network.

4. The method according to claim 1, wherein the method further comprises:
   sending, by the access management network element, reason information to the terminal device, wherein the reason information notifies the terminal device of a reason why the data transmission procedure of the terminal device in the second network is restricted.

5. The method according to claim 1, wherein the second connection status of the terminal device in the first network comprises a state wherein the terminal device is physically connected to an access network.

6. The method according to claim 5, wherein resuming, by the access management network element, the data transmission procedure of the terminal device in the second network, comprises:
   when a duration of the connection status of the terminal device in the first network exceeds a specified duration, resuming, by the access management network element, the data transmission procedure of the terminal device in the second network.

7. The method according to claim 5, wherein the resuming, by the access management network element, the data transmission procedure of the terminal device in the second network comprises:
   sending, by the access management network element, indication information to a user plane data processing network element accessed by the terminal device in the second network, wherein the indication information indicates the user plane data processing network element to send user plane data that is from the terminal device or that is to be sent to the terminal device.

8. The method according to claim 5, wherein the resuming, by the access management network element, the data transmission procedure of the terminal device in the second network, comprises:
   initiating, by the access management network element, a PDU session modification procedure of the terminal device in the second network.

9. The method according to claim 5, wherein the resuming, by the access management network element, the data transmission procedure of the terminal device in the second network, comprises: performing, by the access management network element, a registration procedure of the terminal device in the second network; or
   performing, by the access management network element, a session establishment procedure of the terminal device in the second network; or
   sending, by the access management network element, the information about the second connection status of the terminal device in the first network to a data management network element, wherein the information about the second connection status is used by the data management network element to perform a registration procedure of the terminal device in the second network.

10. The method according to claim 1, wherein the obtaining, by an access management network element, information about a connection status of a terminal device in a first network comprises:
    obtaining, by the access management network element, the information about the first connection status of the terminal device in the first network according to a heartbeat mechanism; or
    receiving, by the access management network element, a message from the following network element accessed by the terminal device in the first network: an access network element, an access management network element, the terminal device, or a user plane function network element, wherein the message comprises the information about the first connection status of the terminal device in the first network.

11. The method according to claim 1, wherein the first connection status of the terminal device in the first network and the second connection status of the terminal device in the first network is a connection status of a wireline connection in the first network.

12. The method according to claim 1, wherein the data transmission procedure of the terminal device in the second network is wireless data transmission procedure of the terminal device in the second network.

13. An apparatus comprising:
    at least one processor coupled with a memory, wherein the at least one processor is configured to execute instructions stored in the memory, to cause the apparatus to perform the following operations:

obtaining information about a first connection status of a terminal device in a first network, wherein the first connection status of the terminal device comprises a deregistered state, a data transmission idle state, or a state wherein the terminal device is physically disconnected from an access network in the first network;

restricting a data transmission procedure of the terminal device in a second network based on the information about the first connection status of the terminal device in the first network; and resuming the data transmission procedure of the terminal device in the second network when the first connection status of the terminal device in the first network changes to a second connection status, wherein the second connection status of the terminal device in the first network comprises a registered state or a data transmission connected state.

14. The apparatus according to claim 13, wherein
the restricting the data transmission procedure of the terminal device in the second network, comprises:
restricting the data transmission procedure of the terminal device in the second network when a duration of the first connection status of the terminal device in the first network exceeds a specified duration.

15. The apparatus according to claim 13, wherein the restricting the data transmission procedure of the terminal device in the second network comprises one of:
initiating a deregistration procedure of the terminal device in the second network; or
initiating a packet data unit (PDU) session release procedure of the terminal device in the second network; or
rejecting a registration procedure of the terminal device in the second network; or
rejecting a session establishment procedure of the terminal device in the second network; or
sending the information about the first connection status of the terminal device in the first network to a policy control network element, wherein the information about the first connection status is used by the policy control network element to initiate a PDU session release procedure of the terminal device in the second network; or
sending the information about the first connection status of the terminal device in the first network to a policy control network element, wherein the information about the first connection status is used by the policy control network element to reject a session establishment procedure of the terminal device in the second network; or
sending the information about the first connection status of the terminal device in the first network to a data management network element, wherein the information about the first connection status is used by the data management network element to perform a deregistration procedure of the terminal device in the second network; or
sending the information about the first connection status of the terminal device in the first network to a session management network element accessed by the terminal device in the second network, wherein the information about the first connection status is used by the session management network element to initiate a PDU session release procedure of the terminal device in the second network.

16. The apparatus according to claim 13, wherein the at least one processor is further configured to execute instructions stored in the memory, to cause the apparatus to perform the following operations:
sending reason information to the terminal device, wherein the reason information notifies the terminal device of a reason why the data transmission procedure of the terminal device in the second network is restricted.

17. The apparatus according to claim 13, wherein the second connection status of the terminal device in the first network comprises a state wherein the terminal device is physically connected to an access network.

18. The apparatus according to claim 17, wherein the resuming the data transmission procedure of the terminal device in the second network comprises:
sending indication information to a user plane data processing network element accessed by the terminal device in the second network, wherein the indication information indicates the user plane data processing network element to send user plane data that is from the terminal device or that is to be sent to the terminal device.

19. The apparatus according to claim 17, wherein the resuming the data transmission procedure of the terminal device in the second network, comprises:
initiating a PDU session modification procedure of the terminal device in the second network.

20. A system comprising:
an access management network element; and
an access network element connected with the access management network element, wherein the access management network element comprises at least one processor coupled with a memory, wherein the at least one processor is configured to execute instructions stored in the memory, to cause the access management network element to perform the following operations:
obtaining information about a first connection status of a terminal device in a first network, wherein the first connection status of the terminal device comprises a deregistered state, a data transmission idle state, or a state wherein the terminal device is physically disconnected from an access network in the first network;
restricting a data transmission procedure of the terminal device in a second network based on the information about the first connection status of the terminal device in the first network; and
resuming, the data transmission procedure of the terminal device in the second network when the first connection status of the terminal device in the first network changes to a second connection status, wherein the second connection status of the terminal device in the first network comprises a registered state or a data transmission connected state.

* * * * *